(12) United States Patent
Berreth

(10) Patent No.: US 7,706,901 B2
(45) Date of Patent: Apr. 27, 2010

(54) LOW LATENCY REAL-TIME AUDIO STREAMING

(75) Inventor: Frank Berreth, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1608 days.

(21) Appl. No.: 10/956,280

(22) Filed: Oct. 1, 2004

(65) Prior Publication Data

US 2006/0074637 A1    Apr. 6, 2006

(51) Int. Cl.
*G06F 17/00*    (2006.01)
(52) U.S. Cl. .............................. 700/94; 710/61; 386/95
(58) Field of Classification Search ............... 700/94
See application file for complete search history.

(56) References Cited

U.S. PATENT DOCUMENTS

| | | | |
|---|---|---|---|
| 5,613,137 A | 3/1997 | Bertram et al. | |
| 5,815,689 A | 9/1998 | Shaw et al. | |
| 5,875,311 A | 2/1999 | Bertram et al. | |
| 5,916,309 A | 6/1999 | Brown et al. | |
| 5,982,672 A | 11/1999 | Moon et al. | |
| 5,995,933 A | 11/1999 | Fado et al. | |
| 6,025,925 A | 2/2000 | Davidson, Jr. et al. | |
| 6,038,625 A | 3/2000 | Ogino et al. | |
| 6,044,225 A | 3/2000 | Spencer et al. | |
| 6,104,700 A | 8/2000 | Haddock et al. | |
| 6,128,317 A | 10/2000 | Mackre | |
| 6,173,358 B1 | 1/2001 | Combs | |
| 6,226,038 B1 | 5/2001 | Frink et al. | |
| 6,259,957 B1 | 7/2001 | Alexander et al. | |
| 6,408,351 B1 | 6/2002 | Hamdi et al. | |
| 6,463,486 B1 * | 10/2002 | Parry et al. | ............... 710/52 |
| 6,564,330 B1 | 5/2003 | Martinez et al. | |
| 6,567,875 B1 | 5/2003 | Williams et al. | |
| 6,629,001 B1 | 9/2003 | Vadivelu | |
| 6,714,724 B1 | 3/2004 | Cook | |
| 6,842,830 B2 | 1/2005 | Khare et al. | |
| 6,956,818 B1 | 10/2005 | Thodiyil | |
| 7,131,135 B1 | 10/2006 | Virag et al. | |
| 7,155,543 B2 | 12/2006 | Lee et al. | |
| 7,194,564 B2 | 3/2007 | Hauck et al. | |
| 2002/0116186 A1 | 8/2002 | Strauss et al. | |
| 2002/0178210 A1 | 11/2002 | Khare et al. | |
| 2003/0009654 A1 | 1/2003 | Nalawadi et al. | |
| 2003/0088326 A1 | 5/2003 | Du et al. | |
| 2004/0003137 A1 * | 1/2004 | Callender et al. | ........... 709/328 |
| 2004/0128402 A1 | 7/2004 | Weaver et al. | |

(Continued)

OTHER PUBLICATIONS

"Audio Codec '97" Intel Revision 2.3 Revision 1.0 Apr. 2002 108 pages.

(Continued)

*Primary Examiner*—Walter F Briney, III
(74) *Attorney, Agent, or Firm*—Lee & Hayes, PLLC

(57) ABSTRACT

Systems and methods for audio streaming in a computing device are described. In one aspect an interface to an adapter driver is provided. The adapter driver is associated with an audio device. The adapter driver and a wave real-time (WaveRT) port driver associated with the computing device use the interface to configure direct access by a client of the computing device and by the audio device to a cyclic buffer. The direct access is for rendering and/or capturing an audio stream. The direct access is independent of any copying by a port driver on the computer system of the audio stream to any buffer.

30 Claims, 4 Drawing Sheets

U.S. PATENT DOCUMENTS

| | | | |
|---|---|---|---|
| 2004/0162911 | A1 | 8/2004 | Sperschneider et al. |
| 2004/0268061 | A1 | 12/2004 | Khare et al. |
| 2005/0060368 | A1 | 3/2005 | Wang et al. |
| 2005/0195752 | A1 | 9/2005 | Amin et al. |
| 2005/0226233 | A1* | 10/2005 | Kryuchkov et al. ......... 370/356 |
| 2006/0031607 | A1 | 2/2006 | Berreth |
| 2006/0041895 | A1 | 2/2006 | Berreth |
| 2007/0220279 | A1 | 9/2007 | Northcutt et al. |

OTHER PUBLICATIONS

High Definition Audio Specification Revision 1.0; Intel Apr. 15 2004 pp. i-174.

Intel I/O Controller Hub 6 (ICH6) High Definition Audio / AC '97; Programmers Reference Manual (PRM); Intel Document No. 302349-001 Jun. 2004 p. 1-207.

Jarrar, et al., "Designing in Azalia for High Performance Audio" Intel Developer Forum Sep. 2003 36 pages.

Analog Devices, "AC'97 SoundPort Codec AD1819B," 1999, pp. 1-28.

"Intel 82801EB (ICH5) I/O 82801ER (ICH5R), and 82801DB (ICH4) Controller Hub: AC '97 PRM," AC '97 Programmer's Reference Manual, Apr. 2003, pp. 1-53.

"A DSP/BIOS Generic DMA McBSP Device Driver for TMS320C5000 DSPs", Software Development Systems, Texas Instruments, Jun. 2003, pp. 1-10.

* cited by examiner

LOW LATENCY REAL-TIME AUDIO STREAMING

TECHNICAL FIELD

This invention pertains to audio rendering and capturing.

SUMMARY

Systems and methods for audio streaming in a computing device are described. In one aspect an interface to an adapter driver is provided. The adapter driver is associated with an audio device. The adapter driver and a wave real-time (WaveRT) port driver associated with the computing device use the interface to configure direct access by a client of the computing device and by the audio device to a cyclic buffer. The direct access is for rendering and/or capturing an audio stream. The direct access is independent of any copying by a port driver on the computer system of the audio stream to any buffer.

BRIEF DESCRIPTION OF THE DRAWINGS

In the Figures, the left-most digit of a component reference number identifies the particular Figure in which the component first appears.

DETAILED DESCRIPTION

Overview

Audio devices that utilize standard wave port drivers, such as WaveCyclic and WavePci drivers, typically require constant attention from the driver to service an audio stream after it enters the run state. For instance, to accommodate the needs of various DMA engines (e.g., unorthodox buffer alignment requirements, limited address range, inability to handle a contiguous buffer of arbitrary length or a sample split between two memory pages, etc.), conventional port drivers give an audio device supplied miniport driver the ability to allocate its own cyclic buffer. The conventional port drivers then copy data at regularly scheduled intervals from an audio buffer into the allocated miniport buffers. The regularly scheduled intervals are a function of a timing window, which is configured to be wide enough to contain the processing cycles needed to copy the data, and then made even larger to accommodate any unforeseen delays and/or timing tolerances in the underlying software-scheduling mechanism.

Unfortunately, such driver copying of audio data from a first audio buffer into a second miniport buffer associated with an audio device introduces audio stream processing latency. This introduced latency increases as the width of the timing window increases. Such processing latencies are substantially incompatible with real-time and low-latency audio applications, possibly resulting in poor audio rendering and/or capture performance.

Another problem with conventional audio port drivers such as the WavePci port driver, is that it uses miniport drivers to perform complex operations that can lead to synchronization errors and other timing problems. For example, a WavePci miniport driver cannot hold its own spin lock when it calls into a port driver to obtain or release mappings. Thus, the miniport driver can not assume that it has exclusive access to any shared data structures that rely on the spin lock to serialize accesses. An additional problem is that the miniport driver has to be configured to revoke mappings at any time during stream playing. For instance, cancellation of an I/O request packet carrying audio data causes the port driver to revoke the unprocessed mappings in the IRP. Failure to perform these operations correctly leads to synchronization errors and other timing problems that may negatively effect an audio application.

To make matters worse, a WavePCi miniport driver continually obtains and releases mappings during the time that the stream is running. Though this is not as onerous as the data-copying overhead described above, the software overhead of handling mappings in such a manner introduces additional audio stream processing latencies, which in turn, reduces audio application performance.

In view of the above, systems and method without the above discussed problems are desired to enhance real-time audio streaming performance.

An Exemplary System

Figure 1:
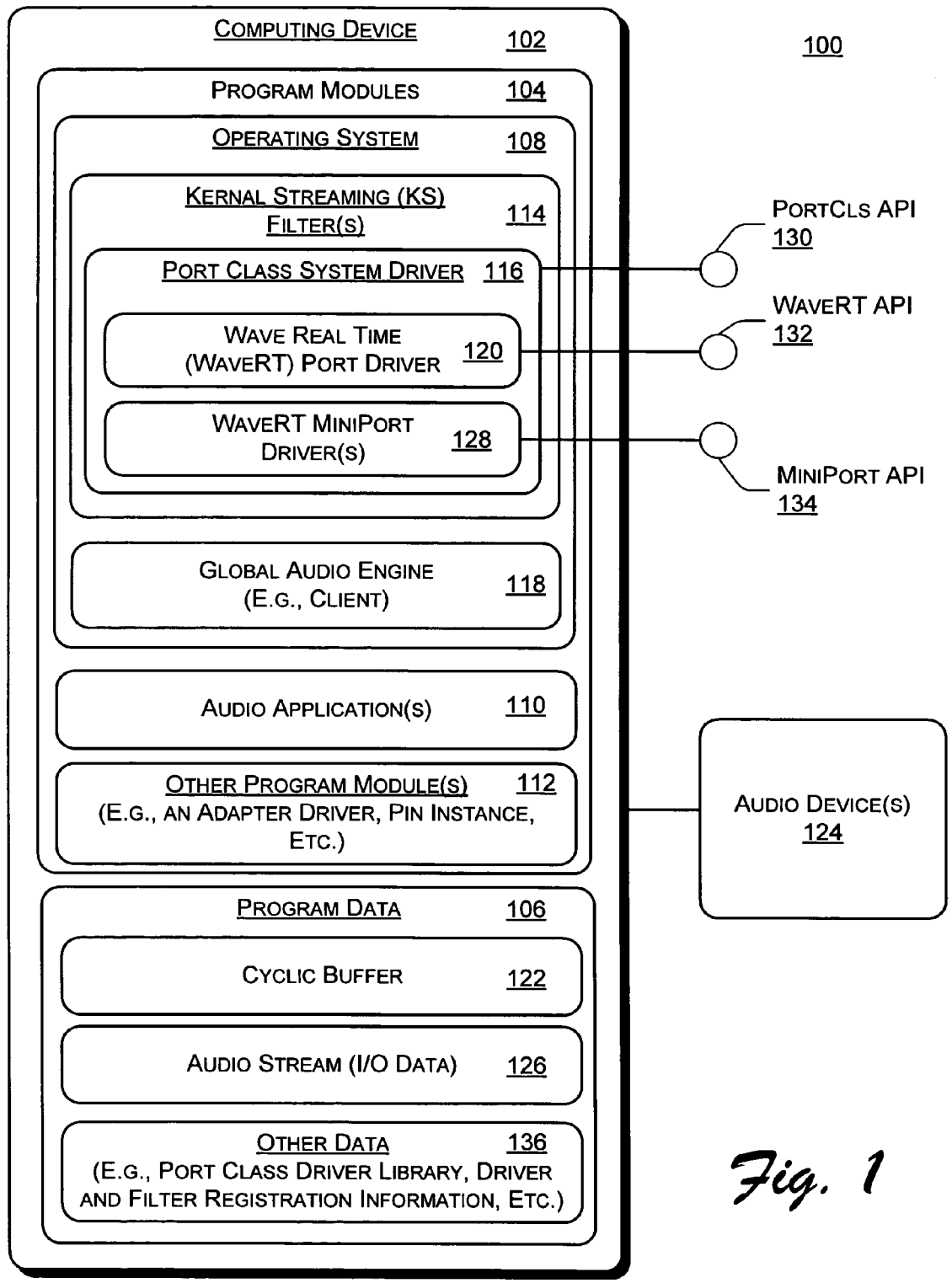
FIG. 1 illustrates an exemplary system for low latency real-time audio streaming.

FIG. 1 illustrates an exemplary system 100 for low latency real-time audio streaming. System 100 includes computing device 102, including program module(s) 104 and program data 106. Program modules include, for example, an operating system (OS) 108, audio application(s) 110, and other program modules 112. OS 108 includes kernel streaming filter(s) 114, which includes port class (PortCls) system driver 116 and global audio engine 118. PortCls system driver 116 provides kernel-streaming (KS) functionality to a client, for example to global audio engine 118, via a set of port drivers. One such port driver is the WaveRT (wave real-time) port driver 120.

WaveRT port driver 120 solves the latency performance problems of standard audio port drivers by providing a client (e.g., global audio engine 118) and component(s) associated with audio device 124 with direct access to cyclic buffer 122 for real-time rendering of an audio stream 126 and/or real-time capture of an audio stream 126. Such direct access eliminates, among other things, copying operation(s) of conventional systems that need to copy an audio stream from a render buffer to audio device specific buffer(s), and eliminates the need for audio device miniport drivers to synchronize access to any data structures that may be shared with port class system driver component(s). More particularly, after global audio engine 118 has mixed playback audio stream(s) 122 from an executing audio application 110, and, subsequently written the mixed audio stream 126 into cyclic buffer 122, audio device 124 pulls audio stream 126 from cyclic buffer 122 for playing—independent of any copying by WaveRT port driver 120 of audio data to any buffer associated with the audio device. WaveRT port driver 120 further reduces latency of rendering and/or capturing audio stream(s) 126 by leveraging real-time scheduling support of OS 108, and/or utilizing hardware innovations, such as the low-latency isochronous transfer modes of PCI Express devices, to complement OS 108 real-time scheduling.

To achieve these ends, WaveRT port driver 120 supports client (e.g., global audio engine 118) setting of a pin to a run state, which allows the client to begin moving audio stream 126 directly to or from the cyclic buffer 122. Thus, and in contrast to conventional port drivers, WaveRT port driver 120 does not use the data-transport facilities in kernel streaming (KS) to play or record audio. This avoids degraded performance associated with data-transport facilities in KS, which include, for example, performance degradation cause by transitions between user mode (application space) and kernel mode (driver space) for each I/O request, blocking while waiting for completion of an I/O request, use of CPU cycles necessary to copy audio data into a miniport supplied buffer, etc.

These and other aspects of system 100 are now described in greater detail.

An Exemplary Procedure for Real-Time Audio Streaming

Figure 2:
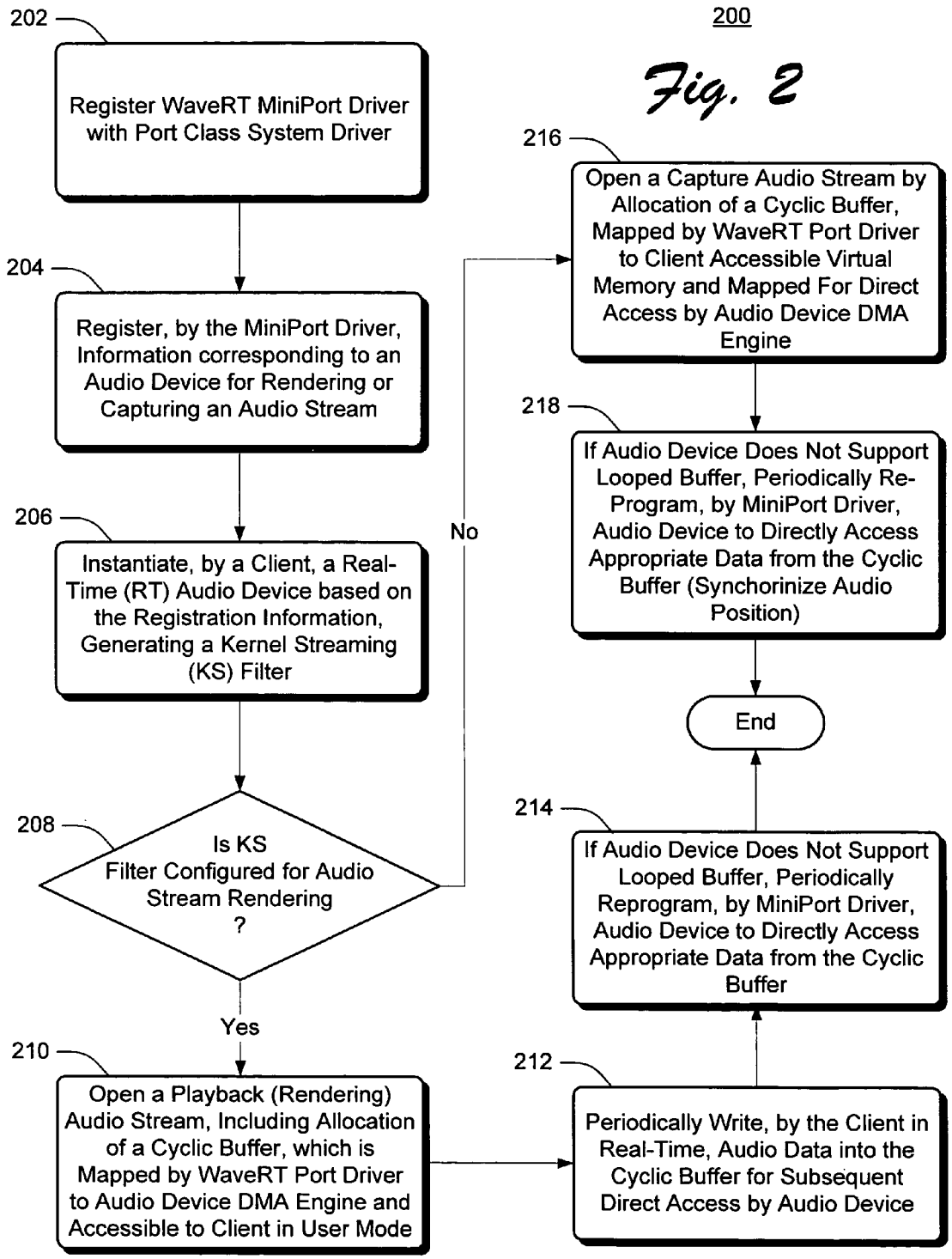
FIG. 2 shows an exemplary procedure for low latency real-time audio streaming.

FIG. 2 shows an exemplary procedure 200 for low latency real-time audio streaming. For purposes of discussion, aspects of the procedure are discussed with respect to the features of FIG. 1 and FIG. 3. The left-most digit of a component reference number identifies the particular figure in which the component first appears. At block 202, and during installation, an adapter driver (shown as a respective portion of "other program modules" 112 of FIG. 1) for a real-time audio device 124 registers a corresponding WaveRT miniport driver 128 with port class system driver 116 as a device interface under a category (e.g., KSCATEGORY_AUDIO, KSCATEGORY_REALTIME, etc.). Such registration is performed via PortCls application programming interface (API) 130, which is exposed by port class system driver 116. A WaveRT miniport driver 128 is associated with an audio device 124 to perform any hardware-specific tasks for the audio device 124. In one implementation, a hardware vendor of audio device 124 supplies the WaveRT miniport driver 128.

At block 204, the registered WaveRT miniport driver 128, in turn, provides registration information to port class system driver 116, regarding a rendering or capture device that represent a respective audio device 124. Such registration information is shown as a respective portion of other data 136 of FIG. 1. In this implementation, the registration information corresponds to a KS filter, which is registered under one of KSCATEGORY_RENDER or KSCATEGORY_CAPTURE categories, respectively. Next, at block 206, a client such as global audio engine 118 enumerates the registered registration information to select and instantiate a real-time audio device represented by a respective KS filter(s) 114. The instantiated KS filter(s) 114 has the following components:

At block 208, it is determined if KS filter(s) 114 performs audio rendering. If so, procedure 200 continues at block 210, wherein the global audio engine 118 (or other client program module 104) specifies, or opens a playback stream as follows:

The global audio engine 118 opens a pin on the KS filter(s) 114, and the WaveRT miniport driver 128 creates the pin instance. While opening the pin, the global audio engine passes the stream's wave data format to the WaveRT miniport driver 128. The miniport driver 128 uses this information to select a proper size for cyclic buffer 122

The audio engine 118 requests a cyclic buffer 122 of a particular size from the WaveRT miniport driver 128 (e.g., with KSPROPERTY_RTAUDIO_BUFFER property, etc. (see the description beginning at the heading Exemplary Designs for Writing WaveRT MiniPort Driver(s))). Responsive to this request, the WaveRT miniport driver 128 allocates cyclic buffer 122. If the hardware (audio device 124) cannot stream from cyclic buffer 122 of the requested size, the WaveRT miniport driver 128 allocates a cyclic buffer 122 that comes as close as possible to this requested size while satisfying the hardware constraints and system 100 resource limitations. WaveRT miniport driver 128 maps cyclic buffer 122 into the hardware's DMA engine (shown as component 316 of FIG. 3). Port class driver 116 makes cyclic buffer 122 accessible to global audio engine 118 in user mode.

At block 212, global audio engine 118 schedules a real-time thread to periodically write audio stream 126 to the cyclic buffer 122. Audio application(s) 110 provide the audio stream 126 for rendering. At block 214, if the audio device 124 does not provide direct support for looped buffers, the miniport driver 128 periodically reprograms the audio device 124. The resulting configuration supplies glitch-free audio on audio hardware 124 that either supports looped buffers or uses a real-time thread to regularly update the hardware.

At block 208, if it is determined that KS filter(s) 114 performs audio capture (recording), procedure 200 continues at block 216, wherein the global audio engine 118 (or other client program module 104) opens a capture stream as follows:

The miniport driver 128 might have to allocate a cyclic buffer 122 that is bigger or smaller than the requested size (e.g., buffer alignment/size requirements of hardware), depending on the hardware 124 restrictions and available system 100 resources. To ensure that the buffer 122 is accessible to the audio hardware (e.g., a microphone such as that shown in FIG. 4), the miniport driver 128 uses memory (a respective portion of program data 106) accessible to WaveRT port driver 120 to allocate the cyclic buffer 122.

WaveRT port driver 120 maps the allocated cyclic buffer 122 into a contiguous block of virtual memory that the user-mode client 118 can access. Miniport driver 128 maps the entire allocated buffer 122 into the DMA hardware buffer queue.

At block 218, Miniport driver 128 performs workarounds, if any, to configure the hardware to cycle through the buffer. For example, if a chipset does not support buffer looping in hardware, miniport driver 128 updates a single hardware register periodically, which is done in either an interrupt service routine (ISR) or a real-time thread. The consumption of processing resources by this operation is minimal.

Stream Latency During Playback

Figure 3:
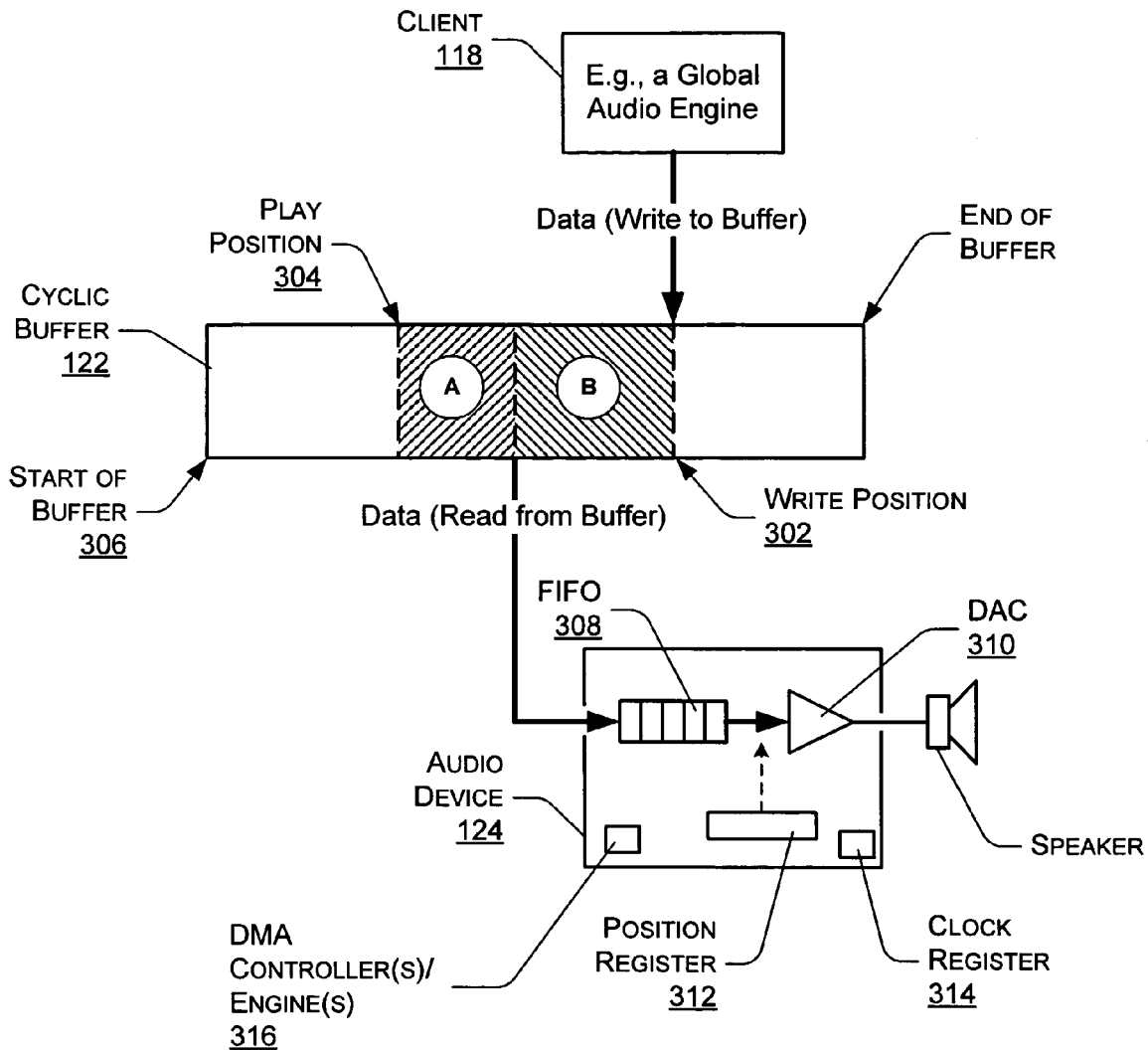
FIG. 3 is an exemplary architecture for a client to write audio data into a cyclic buffer, and for an audio device to read audio data from the cyclic buffer.

FIG. 3 is an exemplary architecture 300 for a client (e.g., global audio engine 118) to write audio stream 126 into a cyclic buffer 122, and for an audio device 124 to directly access and read audio stream 126 from cyclic buffer 122. For purposes of discussion, aspects of architecture 300 are discussed with respect to the features of FIG. 1. The left-most digit of a component reference number identifies the particular figure in which the component first appears. As described above, once the cyclic buffer has been mapped for direct access by DMA controller(s)/engine(s) 316 associated with the audio device 124, the role of WaveRT port driver 120 is minimal while an audio playback stream 126 remains in the run state. As shown in FIG. 1, the client 118 writes audio stream 126 to the cyclic buffer 122, and without any subsequent copying of the written data from the cyclic buffer into a different buffer accessible by the DMA controller(s) 316, the audio device 124 reads the audio stream 126 from cyclic buffer 122 for playing. This activity requires no port class system driver 116 intervention. The audio device 124 is a hardware component, and client 118 is a software component.

In FIG. 3, write position 302 is the location just past a last audio sample (piece of data) that the client 118 wrote to the buffer 122. Play position 304 is a piece of data (sample) that the audio device 124 is currently playing. Write 302 and play 304 positions continually progress from left to right as audio stream flows through buffer 122. When the write or play position reaches the end of buffer 122, it wraps around to the start 306 of buffer 122.

The latency from the time that client 118 writes an audio sample (a portion of audio stream) to buffer 122 until the audio device 124 plays it is the separation between write position 302 and play position 304. In this example, this separation is the sum of the following two sources of latency (marked as A and B in FIG. 1):

Latency A: After the audio device reads data from the buffer, the data resides in a hardware first in, first out (FIFO) buffer 308 until the audio device clocks the data through the digital-to-analog converter (DAC) 310.

Latency B: After the client writes audio stream to cyclic buffer 122, audio stream 126 resides in buffer 122 until audio device 124 reads audio stream.

Client 118 has no control over latency A, which depends entirely on the hardware. A typical FIFO 308 might store enough samples to feed the DAC 310 for roughly 64 ticks of the sample clock. However, client 118 does control latency B. Making latency B too large introduces unnecessary delays into the system; however, making it too small risks starving the audio device. By scheduling a real-time thread to update buffer 122, client 118 can make the latency smaller than would otherwise be practical.

To determine how small the separation between the write and play positions is without risking FIFO 308 starvation (underflow conditions), client 118 considers hardware delays that audio stream 126 encounters from the time that client 118 writes audio stream 126 to cyclic buffer 122 until audio stream 126 is played by device 124.

After calculating how much separation to maintain between the write and play positions, client 118 monitors the play position 304 at regular time intervals to determine how far to advance write position 302. At the start of each interval, client 118 writes enough audio stream 126 data to cyclic buffer 122 to keep the hardware busy through the start of the next time interval. One way to obtain play position 304 is through the KSPROPERTY_AUDIO_POSITION property request, which is part of API 134, but each request requires a transition between user mode and kernel mode. In this implementation, PortCls 116 supports a KSPROPERTY_RTAUDIO_POSITION-REGISTER property request, which provides a more efficient means for obtaining play position 304. If the audio hardware contains a position register 312 that points to the play position 304, the property request maps the register 312 into a virtual memory address that is accessible to the user-mode client 118. Thereafter, the client 118 simply reads the current value of the register from this address and no kernel-mode transition is required.

Stream Latency During Recording

The role of the WaveRT port driver 120 is minimal while an audio recording stream remains in the run state. As shown in FIG. 3, the audio device 124 captures the audio stream and writes it to the cyclic buffer 122, and then the client 118 reads the audio stream 126 from the buffer 122. This activity requires no intervention (e.g., no audio data copying) by the driver. FIG. 1 also identifies the record (or write) position 302 as the buffer location of the sample that the audio device 124 is currently recording (e.g., capturing from a microphone through an analog-to-digital converter, or ADC). Note that the write position 302 is the future buffer location into which the audio device 124 will write the sample after it passes through the FIFO 308. The read position 304 is the next sample that the global audio engine 118 will read from the buffer 122. The record and read positions continually progress from left to right as the audio stream flows through the buffer 122. When the record or read position reaches the end of the buffer, it wraps around to the start of the buffer.

The latency from the time that the audio device 124 captures an audio sample in the ADC until the client 118 reads it is simply the separation between the record position and read position. This separation is the sum of the following sources of latency (marked in this example as A and B):

Latency A: After capturing audio stream from the ADC, the audio device 124 stores the audio stream in a hardware FIFO 308 until it can write the audio stream to the cyclic buffer 122.

Latency B: After the audio device 124 writes audio stream to the cyclic buffer 122, the audio stream resides in the buffer 122 until the client 118 reads the audio stream 126.

Latency C: The time that is needed for hardware to flush the FIFO into memory. This time can vary and has no upper bound.

The client has no control over latencies A and C, because they depend on the hardware (audio device 124). A typical FIFO 308 might store roughly 64 samples from the ADC. However, the client does control latency B. Making latency B too large introduces unnecessary delays into the system. By scheduling a real-time thread to read the buffer, the client can make the latency smaller than would otherwise be practical.

To determine how small the separation between the read 304 and record 302 positions is made without causing glitches, the client 118 considers any hardware delays that the data encounters from the time that the audio device 124 captures the audio stream until the client 118 reads the audio stream from the cyclic buffer 122. In addition to the delay through the audio device's internal FIFO 308, other hardware delays might exist. For example, packet-based hardware interfaces such as PCI Express introduce transport delays from the time that the hardware device initiates a write operation until the data appears in main memory. The client can obtain a summary of these delays by sending a KSPROPERTY_RTAUDIO_HWLATENCY property request to miniport port driver 120. KSPROPERTY_RTAUDIO_HWLATENCY property request is part of API 134. The client 118 can obtain a summary of the delays by sending a KSPROPERTY_RTAUDIO_HWLATENCY property request to WaveRT port driver 120.

After calculating how much separation to maintain between the record 302 and read 304 positions, client 118 monitors the record position at regular intervals to determine how much the read position lag. During each interval, the client reads only the data that the audio device is certain to have already written to the buffer. The client can obtain the current record position through either a KSPROPERTY_AUDIO_POSITION or KSPROPERTY_RTAUDIO_POSITIONREGISTER property request via API 134, which is exposed by WaveRT mini port driver 120. In this implementation, the latter is more efficient because it allows the client to read the record position directly, without incurring the cost of a kernel-mode transition.

Exemplary Designs for Writing WaveRT MiniPort Driver(s)

This section presents guidelines for writing WaveRT miniport driver(s) 128 and designing audio hardware 124 that is WaveRT-compatible.

Hardware Latency

A WaveRT miniport driver 128 provides an implementation of the IMiniportWaveRTStream::GetHardwareLatency method. This method supports the KSPROPERTY_RTAUDIO_HWLATENCY property.

FIFO Overruns/Underruns

A WaveRT miniport driver 128 automatically reports FIFO 308 (FIG. 3) overruns and underruns. This feature is helpful in detecting glitches in the audio stream during testing of the audio device 124 and driver 128 software.

Scatter-Gather DMA and Buffer Looping

For new designs, hardware implementers design DMA channels for their audio devices 124 to support the following features:
- Scatter-gather transfers—A DMA controller 318 with scatter-gather capability requires no driver intervention to move audio stream to or from an audio buffer 122 consisting of a series of physical memory pages that are not contiguous in physical memory.
- Automatic buffer looping—After reaching the end of a cyclic buffer 122 containing audio stream 126, a DMA controller 318 with buffer-looping capability requires no driver intervention to begin accessing the data at the beginning of the cyclic buffer.

Note that the WaveRT port driver 120 supports existing hardware designs that lack the ability to perform scatter-gather transfers or automatic buffer looping. If an audio device 124 lacks scatter-gather capability, the WaveRT miniport driver 128 allocates cyclic buffers 122 consisting of pages that are physically contiguous in memory. If an audio device lacks automatic buffer looping, WaveRT miniport driver 128 intervenes when the DMA channel reaches the end of the cyclic buffer 122 by configuring the DMA channel to begin transferring data at the beginning of cyclic buffer 122.

Position Registers

For new designs, hardware implementers include a position register 312 for each DMA channel (the audio device 124 provides the DMA channel). A position register indicates the current buffer position as a byte offset from the beginning 306 of cyclic buffer 122. The position register reading is zero at the beginning of the buffer. When the position register reaches the end of the cyclic buffer, it automatically wraps around to the beginning of the buffer (resets to zero) and continues to increment as the buffer position advances. Position registers are mapped to virtual memory so that clients 118 can read the registers directly.

In one implementation, position registers 312 indicate the buffer position of the audio data/samples that are currently moving through the audio device's digital-to-analog and analog-to-digital converters (DACs and ADCs). However, this information might not be directly available from an audio chip set that divides the digital and analog functions into separate bus-controller and codec chips. Typically, the position registers are located in a bus-controller chip, and each register indicates the position of the audio stream that the controller is writing to or reading from codecs. After obtaining a reading from this type of position register, the client can estimate the current position of the samples that are moving through the DACs or ADCs by adding or subtracting the delay through a codec. A client obtains the codec delay from the KSPROPERTY_RTAUDIO_HWLATENCY property request. For this reason, a WaveRT miniport driver 128 accurately reports the codec delay when the port driver calls the IMiniportWaveRTStream::GetHardwareLatency method in response to this type of property request.

Note that the WaveRT port driver 128 supports existing hardware designs that lack position registers 312. For a device with this limitation, the WaveRT miniport driver purposefully fails calls to the IMiniportWaveRTStream::GetPositionRegister method, which forces the port driver 120 to fail KSPROPERTY_RTAUDIO_GETPOSITIONREGISTER property requests. In this case, clients 118 obtain the current position through the KSPROPERTY_AUDIO_GETPOSITION property, which incurs the overhead of a transition between user mode and kernel mode for each position reading.

Clock Register

In one implementation, a WaveRT-compatible audio device 124 includes a clock register 314, a useful hardware feature. Audio application programs 110 can use clock registers to synchronize audio streams in two or more independent audio devices that have separate and unsynchronized hardware clocks. Without clock registers, an application is unable to detect and compensate for the drift between the hardware clocks.

The sample clock that the audio hardware uses to clock audio data through the digital-to-analog or analog-to-digital converters be derived from the internal clock that increments the clock register. A clock register that increments at a rate that is asynchronous with respect to the sample clock is of no use for synchronization and not be exposed. Similar to the position registers, the clock register is mapped to virtual memory so that clients can read the register directly.

Register Access

User-mode software (e.g., clients 118) does not directly alter the state of any hardware register, and does not read any registers other than the clock register 314 and position registers 312. To these ends, hardware designers mirror the clock register and position registers into a separate memory page (or pages) that are mapped to the client's virtual address space. This page mirror none of the audio device's other hardware registers. In addition, the hardware restricts accesses of the clock and position registers in the mirrored page to read-only.

APOs and GFX Filters

A WaveRT miniport driver 120 never need to touch the audio stream 126 in an audio device's cyclic buffer 122. As discussed previously, the hardware is designed so that audio stream 126 flows directly between the client 118 and audio hardware 126 with no intervention by the audio driver software 128. However, OS 108 provides two means to perform software processing of audio data 126 without violating this rule:

Audio processing objects (APOs)—APOs perform generic audio processing functions (for example, equalization) that are not specific to a particular audio device. An APO processes an audio stream from an application before that stream is added to the global mix. Global (GFX) effects filters—GFX filters perform hardware-specific processing of an audio stream. A GFX filter is tied to a particular audio device by the .inf file that installs the device. The effect of a GFX filter is global because it affects the global mix that plays through the audio device. For purposes of illustration, such APOs and GFX filters are respective portions of other program module(s) 112 or other data 136 of FIG. 1.

Global mixing is performed by the global audio engine 118, which is the user-mode system component that is responsible for mixing the audio streams from audio application(s) 110. Typically, the global audio engine is the client that directly exchanges data with the WaveRT audio device through the cyclic buffer 122.

When a user enables an APO, the system inserts the APO into one of the global audio engine's input streams. When the user enables a GFX filter, the system inserts that filter into the output stream from the global audio engine. The global audio engine executes all enabled APOs and GFX filters synchronously: (a) before performing global mixing, the engine runs the APOs on the input streams; and (b) after performing global mixing, the engine runs the GFX filters on the output stream. This scheme eliminates all the scheduling uncertainties that would result from scheduling the APOs and GFX filters as separate threads. Thus, the contribution of APOs and GFX filters to audio stream latency reduces simply to their execution times.

Exemplary WaveRT Port Driver and WaveRT MiniPort Driver Interfaces

This section describes exemplary interfaces, properties, and structures that are used by the WaveRT port driver 120 and WaveRT miniport driver 128. The WaveRT port driver and miniport driver communicate with each other through four primary device driver interfaces respectively encapsulated by APIs 132 or 134.

The WaveRT port driver 120 presents the following interfaces to the miniport driver via API 132:

IPortWaveRT—The main interface that the WaveRT port driver exposes to a miniport driver.

IPortWaveRTStream—A stream-specific interface providing helper functions that the WaveRT miniport driver calls to perform allocation and mapping of cyclic buffers.

The WaveRT miniport driver presents the following interfaces to the port driver:

IMiniportWaveRT—The main interface that the WaveRT miniport driver exposes to the portcls driver 116 via miniport API 134.

IMiniportWaveRTStream—The interface representing the wave stream that flows through a pin on a WaveRT filter.

We now describe these respective interfaces

IPortWaveRT

The IPortWaveRT interface is the main interface that the WaveRT port driver 120 exposes to the adapter driver that implements the WaveRT miniport driver object 128. An adapter driver creates an IPortWaveRT object by calling PcNewPort and specifying REFIID IID_IPortWaveRT. IPortWaveRT inherits from the IPort interface. GUID constant IID_IPortWaveRT is defined in header file portcls.h.

An adapter driver (see, other program modules 112) forms a port-miniport driver pair by binding an IPortWaveRT object to an IMiniportWaveRT object. The PortCls system driver 116 registers this pair with the system 100 as a real-time wave filter(s) 114.

IPortWaveRT inherits the methods in the IPort interface. In this implementation, it provides no additional methods.

IPortWaveRTStream

The IPortWaveRTStream interface is an audio stream-specific interface 134 that provides helper methods for use by the WaveRT miniport driver 120. The miniport driver calls these methods to perform allocation and mapping of cyclic buffers 122 for audio data 126. The WaveRT port driver implements this interface. The port driver gives an IPortWaveRTStream object reference to each miniport driver stream object that it creates. IPortWaveRTStream inherits from the IUnknown interface.

An audio stream 126 is associated with a pin instance on a WaveRT filter(s) 114. The adapter driver forms the filter by binding the WaveRT port and miniport drivers. When the port driver calls the IMiniportWaveRT::NewStream method to create the miniport driver stream object, the port driver passes an IPortWaveRTStream reference as one of the method's call parameters.

To allocate the memory needed for the cyclic buffer, the miniport driver calls the IPortWaveRTStream interface's AllocatePagesForMdl or AllocateContiguousPagesForMdl method. The interface provides additional methods for mapping the allocated pages, unmapping them, and freeing them.

The methods in the IPortWaveRTStream interface are based on and are similar to the MmXxx kernel functions that do allocation and mapping of memory descriptor lists (MDLs). However, the MmXxx functions cannot simply be used in place of the IPortWaveRTStream methods.

In addition to the methods that IPortWaveRTStream inherits from the IUnknown interface, IPortWaveRTStream supports the following methods:

IPortWaveRTStream::AllocateContiguousPagesForMdl
IPortWaveRTStream::AllocatePagesForMdl
IPortWaveRTStream::MapAllocatedPages
IPortWaveRTStream::UnmapAllocatedPages
IPortWaveRTStream::FreePagesFromMdl IPortWaveRTStream::AllocateContiguousPagesForMdl The AllocateContiguousPagesForMdl method allocates a list of contiguous, nonpaged, physical memory pages and returns a pointer to a memory descriptor list (MDL) that describes them.

```
PMDL
  AllocateContiguousPagesForMdl(
    IN PHYSICAL_ADDRESS LowAddress,
    IN PHYSICAL_ADDRESS HighAddress,
    IN SIZE_T TotalBytes
  );
```

Parameters

LowAddress

Specifies the low end of the address range from which the storage for the MDL is allocated.

HighAddress

Specifies the high end of the address range from which the storage for the MDL is allocated.

TotalBytes

Specifies the total number of bytes to allocate for the MDL. This method allocates an integral number of memory pages.

Return value: AllocateContiguousPagesForMdl returns a pointer to an MDL describing a list of physical memory pages. If the method is unable to allocate the requested buffer, it returns NULL.

The driver calls this method to allocate a block of physically contiguous memory pages. All the physical memory pages in the MDL fall within the specified address range. If sufficient memory is available, the memory allocation will be the requested size rounded up to the next page; otherwise, the call fails.

After a system has been running for some time, the system's pool of nonpaged memory tends to become fragmented, increasing the probability that a request to allocate a large block of contiguous physical memory will fail. If the audio device's DMA controller does not require the physical memory pages to be contiguous, the driver call IPortWaveRTStream::AllocatePagesForMdl instead. Unlike AllocateContiguousPagesForMdl, the AllocatePagesForMdl method is not affected by memory fragmentation.

The AllocateContiguousPagesforMdl method allocates memory pages that are locked (nonpaged) but unmapped. If the miniport driver requires software access to this memory, the miniport driver must make a subsequent call to IPortWaveRTStream::MapAllocatedPages to map the pages into kernel-mode address space. See also, IPortWaveRTStream::AllocatePagesForMdl, IPortWaveRTStream::MapAllocatedPages IPortWaveRTStream::AllocatePagesForMdl The AllocatePagesforMdl method allocates a list of nonpaged physical memory pages and returns a pointer to a memory descriptor list (MDL) that describes them.

```
PMDL
  AllocatePagesForMdl(
    IN PHYSICAL_ADDRESS HighAddress,
    IN SIZE_T TotalBytes
  );
```

Parameters

HighAddress
Specifies the high end of the address range from which the storage for the MDL is allocated. The low end of the address range is implicitly zero.

TotalBytes
Specifies the total number of bytes to allocate for the MDL. This method allocates an integral number of memory pages.

Return value: AllocatePagesforMdl returns a pointer to an MDL describing a list of physical memory pages. If the method is unable to allocate th requested buffer, it returns NULL.

The driver calls this method to allocate memory that is mapped to user or kernel mode. The physical memory pages in the MDL are not necessarily contiguous in physical memory, but they all fall within the specified address range. The method allocates an integral number of pages. If sufficient memory is available, the memory allocation will be the requested size rounded up to the next page. Otherwise, the memory allocation is less than the requested size. The caller check how many bytes are actually allocated.

If the audio device's DMA controller requires the physical memory pages in the buffer to be contiguous, the driver call IPortWaveRTStream::AllocateContiguousPagesForMdl instead.

Like the MmAllocatePagesForMdl function, the AllocatePagesforMdl method allocates memory pages that are locked (nonpaged) but unmapped. If the miniport driver requires software access to this memory, the miniport driver must make a subsequent call to IPortWaveRTStream::MapAllocatedPages to map the pages into kernel-mode address space. Callers of the AllocatePagesForMdl method are running at IRQL PASSIVE_LEVEL. See also, IPortWaveRTStream::AllocateContiguousPagesForMdl, IPortWaveRTStream::MapAllocatedPages.

IPortWaveRTStream::MapAllocatedPages

The MapAllocatedPages method maps a list of previously allocated physical pages into a contiguous block of virtual memory that is accessible from kernel mode.

```
PVOID
  MapAllocatedPages(
    IN PMDL MemoryDescriptorList,
    IN MEMORY_CACHING_TYPE CacheType
  );
```

Parameters

MemoryDescriptorList
Pointer to the MDL that is to be mapped. The MDL is allocated by calling either IPortWaveRTStream::AllocatePagesForMdl or
IPortWaveRTStream::AllocateContiguousPagesForMdl.

CacheType
Specifies the cache type. Set this parameter to one of the following MEMORY_CACHING_TYPE enumeration values: MmNonCached, MmCached, or MmWriteCombined.

Return value: MapAllocatedPages returns the starting address of the mapped buffer in virtual memory. If the method is unable to map the buffer, it returns NUL This method maps the physical memory pages in the MDL into kernel-mode virtual memory. Typically, the miniport driver calls this method if it requires software access to the scatter-gather list for an audio buffer. In this case, the storage for the scatter-gather list must have been allocated by the IPortWaveRTStream::AllocatePagesForMdl or IPortWaveRTStream::AllocateContiguousPagesForMdl method.

A WaveRT miniport driver not require software access to the audio buffer itself. MapAllocatedPages is similar in operation to the MmMapLockedPagesSpecifyCache function. The miniport driver is responsible for unmapping the memory prior to freeing it. For more information, see IPortWaveRTStream::UnmapAllocatedPages. Callers of the MapAllocatedPages method run at IRQL PASSIVE_LEVEL. See also, IPortWaveRTStream::AllocatePagesForMdl, IPortWaveRTStream::AllocateContiguousPagesForMdl, IPortWaveRTStream::UnmapAllocatedPages.

IPortWaveRTStream::UnmapAllocatedPages

The UnmapAllocatedPages method releases a mapping.

```
VOID
  UnmapAllocatedPages(
    IN PVOID BaseAddress,
    IN PMDL MemoryDescriptorList
  );
```

Parameters

BaseAddress

Pointer to the base virtual address to which the physical pages were mapped

MemoryDescriptorList

Pointer to an MDL describing the physical pages

Return value: None

The miniport driver calls this method to release a mapping that was set up by a previous call to IPortWaveRTStream::MapAllocatedPages. The driver must release the mapping before calling IPortWaveRTStream::FreePagesFromMdl to free the MDL. This method is similar in operation to the MmUnmapLockedPages function. Callers of the UnmapAllocatedPages method run at IRQL PASSIVE_LEVEL.

See also, IPortWaveRTStream::MapAllocatedPages, IPortWaveRTStream::FreePagesFromMdl.

IPortWaveRTStream::FreePagesFromMdl

The FreePagesFromMdl method frees an MDL.

```
VOID
  FreePagesFromMdl(
    IN PMDL MemoryDescriptorList
    );
```

Parameters

MemoryDescriptorList

Pointer to the MDL

Return value: None

The miniport driver calls this method to free an MDL that was previously allocated by calling either IPortWaveRTStream::AllocatePagesForMdl or IPortWaveRTStream::AllocateContiguousPagesForMdl.

FreePagesFromMdl frees both the physical memory pages described in the MDL and the MDL itself. On return, the MDL pointer value in the MemoryDescriptorList parameter is no longer valid. Callers of the FreePagesFromMdl method run at IRQL PASSIVE_LEVEL.

See also, IPortWaveRTStream::AllocatePagesForMdl, IPortWaveRTStream::AllocateContiguousPagesForMdl IMiniportWaveRT The IMiniportWaveRT interface is the primary interface that is exposed by the miniport driver for a WaveRT audio device. The adapter driver creates the WaveRT miniport driver object and passes the object's IMiniportWaveRT interface pointer to the WaveRT port driver's IPort::Init method. IMiniportWaveRT inherits from the IMiniport interface.

An adapter driver forms a miniport-port driver pair by binding an IMiniportWaveRT object to an IPortWaveRT object. The PortCls system driver registers this pair with the system as a real-time wave filter.

In addition to the methods that IMiniportWaveRT inherits from the IMiniport interface, IMiniportWaveRT supports the following methods:

IMiniportWaveRT::Init

IMiniportWaveRT::NewStream

IMiniportWaveRT::Init

The Init method initializes the WaveRT miniport driver object.

```
NTSTATUS
  Init(
    IN PUNKNOWN UnknownAdapter,
    IN PRESOURCELIST ResourceList,
    IN PRTPORT Port
    );
```

Parameters

UnknownAdapter

Pointer to the IUnknown interface of the adapter driver object whose miniport driver object is being initialized.

ResourceList

Pointer to the IResourceList interface of a resource-list object. This object specifies the list of hardware resources that the adapter driver has allocated to the miniport driver. After passing this reference to the miniport driver, the port driver might examine the contents of the resource list but it will not modify the contents of this list.

Port

Pointer to the port driver's IPortWaveRT interface. The caller specifies a valid, non-NULL pointer value for this parameter.

Return value: Init returns STATUS_SUCCESS if the call was successful. Otherwise, the method returns an appropriate error status code.

Comments: The ResourceList parameter is the same pointer value that the adapter driver earlier passed as a parameter to the IPortWaveRT object's Init method. The ResourceList and Port parameters follow the reference-counting conventions for COM objects. The Init method is called at IRQL PASSIVE_LEVEL. See also, IPortWaveRT.

IMiniportWaveRT::NewStream

The NewStream method creates a new instance of a WaveRT stream object.

```
NTSTATUS
  NewStream(
    OUT PMINIPORTWAVERTSTREAM Stream,
    IN PRTPORTSTREAM PortStream,
    IN ULONG Pin,
    IN BOOL Capture,
    IN PKSDATAFORMAT DataFormat
    );
```

Parameters

Stream

Output pointer for the new stream. This parameter points to a caller-allocated pointer variable into which the method writes a pointer to the new stream object's IMiniportWaveRTStream interface. The caller specifies a valid, non-NULL pointer for this parameter.

PortStream

Pointer to the IPortWaveRTStream interface of the port driver's stream object.

Pin

Specifies a pin ID identifying the pin that is to be opened. If the WaveRT miniport driver's filter descriptor specifies a total of n pin factories on the filter, then valid values for parameter Pin are in the range 0 to n−1.

Capture

Specifies whether to create a capture stream or a render stream. This parameter is TRUE for a capture (input) stream, and FALSE for a playback (output) stream.

DataFormat

Pointer to a KSDATAFORMAT structure specifying the new stream's data format. See the following Comments section.

Return value: NewStream returns STATUS_SUCCESS if the call was successful. Otherwise, the method returns an appropriate error status code.

Comments: The NewStream method sets the initial state of the stream to KSSTATE_STOP and its initial position to zero. (See related methods IMiniportWaveRTStream::SetState and IMiniportWaveRTStream::GetPosition). The DataFormat parameter, which specifies the data format of the stream, points to one of the following audio-specific, extended versions of the KSDATAFORMAT structure:

KSDATAFORMAT_WAVEFORMATEX
KSDATAFORMAT_DSOUND

The Stream and PortStream parameters follow the reference-counting conventions for COM objects. The NewStream method is called at IRQL PASSIVE_LEVEL. See also, IMiniportWaveRTStream, IPortWaveRTStream, IMiniportWaveRTStream::SetState, IMiniportWaveRTStream::GetPosition IMiniportWaveRTStream The IMiniportWaveRTStream interface represents the wave stream that flows through a pin on the KS filter that wraps a WaveRT rendering or capture device. The miniport driver implements the IMiniportWaveRTStream interface and exposes it to the port driver. The miniport driver creates a stream object with this interface when the port driver calls the IMiniportWaveRT::NewStream method. IMiniportWaveRTStream inherits from the IUnknown interface.

In addition to the methods that IMiniportWaveRTStream inherits from the IUnknown interface, IMiniportWaveRTStream supports the following methods:

IMiniportWaveRTStream::AllocateAudioBuffer
IMiniportWaveRTStream::GetClockRegister
IMiniportWaveRTStream::GetHardwareLatency
IMiniportWaveRTStream::GetPosition
IMiniportWaveRTStream::GetPositionRegister
IMiniportWaveRTStream::SetFormat
IMiniportWaveRTStream::SetState IMiniportWaveRTStream::AllocateAudioBuffer The AllocateAudioBuffer method allocates a cyclic buffer for audio data.

```
NTSTATUS
  AllocateAudioBuffer(
    IN ULONG RequestedSize,
    OUT PMDL *AudioBufferMdl,
    OUT ULONG *ActualSize,
    OUT ULONG *OffsetFromFirstPage
  );
```

Parameters

RequestedSize

Specifies the requested size in bytes of the audio buffer.

AudioBufferMdl

Output pointer for an MDL describing the audio buffer. This parameter points to a caller-allocated pointer variable into which the method writes a pointer to the MDL.

ActualSize

Output pointer for the actual size in bytes of the allocated buffer. This parameter points to a ULONG variable into which the method writes the size value.

OffsetFromFirstPage

Output pointer for the buffer's offset in bytes from the start of the first page in the MDL. This parameter points to a caller-allocated ULONG variable into which the method writes the offset value.

Return Values: AllocateAudioBuffer returns STATUS_SUCCESS if the call was successful. Otherwise, the method returns an appropriate error status code. The following table shows some of the possible error status codes.

| Status Code | Meaning |
| --- | --- |
| STATUS_INSUFFICIENT_RESOURCES | Insufficient memory is available to allocate the buffer. |
| STATUS_DEVICE_NOT_READY | The device is not ready. |

Comments: After receiving a KSPROPERTY_RTAUDIO_GETBUFFER request from the client, the port driver calls the AllocateAudioBuffer method to allocate a cyclic buffer that the port driver can later map to the client's virtual address space.

During the call to AllocateAudioBuffer, the miniport driver allocates the cyclic buffer by calling either IPortWaveRTPin::AllocatePagesForMdl or IPortWaveRTPin::AllocateContiguousPagesForMdl. The miniport driver also programs the audio hardware to play from or record into this buffer, but it does not start the DMA transfers until the port driver calls IMiniportWaveRTStream::SetState with State=KSSTATE_RUN. The output parameters from the AllocateAudioBuffer method include the MDL for the audio buffer, the actual size of the driver-allocated buffer, and the offset of the start of the buffer from the start of the first page in the MDL.

RequestedSize is an input parameter indicating the size that the client is requesting for the audio buffer. ActualSize is an output parameter indicating the actual size of the audio buffer.

The audio device might require the audio buffer to begin and end on sample boundaries or to meet other types of hardware-dependent alignment constraints. If sufficient memory is available, the buffer's actual size will be the requested size rounded (up or down) to the nearest sample or other hardware-constrained boundary. Otherwise, the actual size is less than the requested size.

The AllocateAudioBuffer method is called at IRQL PASSIVE_LEVEL. See also,

KSPROPERTY_RTAUDIO_GETBUFFER,
IPortWaveRTPin::AllocatePagesForMdl,
IPortWaveRTPin::AllocateContiguousPagesForMdl,
IMiniportWaveRTStream::SetState

IMiniportWaveRTStream::GetClockRegister

The GetClockRegister method retrieves the information that the port driver needs to map a hardware wall clock register into virtual memory.

```
NTSTATUS
  GetClockRegister(
    OUT PMDL *RegisterMdl,
    OUT ULONG *ByteOffset,
    OUT ULONG *Width,
    OUT ULONGLONG *Numerator,
    OUT ULONGLONG *Denominator
  );
```

Parameters
  RegisterMdl
    Output pointer to an MDL describing the register mapping. This parameter is a pointer to a caller-allocated pointer variable of type PMDL. The stream object creates an MDL that describes the physical memory page containing the hardware register. The method writes the virtual memory address of the MDL to the location pointed to by the RegisterMdl parameter.
  ByteOffset
    Output pointer for the byte offset of the hardware register from the beginning of the memory page containing the register. This parameter points to a caller-allocated ULONG variable into which the method writes the offset value.
  Width
    Output pointer for the width in bits of the clock register. This parameter points to a caller-allocated ULONG variable into which the method writes the width value. The method specify a register width of 32 or 64 bits.
  Numerator
    Output pointer for the numerator of the frequency at which the clock register increments. This parameter points to a caller-allocated ULONGLONG variable into which the method writes the numerator value. For more information, see the following Comments section.
  Denominator
    Output pointer for the denominator of the frequency at which the clock register increments. This parameter points to a caller-allocated ULONGLONG variable into which the method writes the denominator value. For more information, see the following Comments section.
  Return value: GetClockRegister returns a status value of STATUS_SUCCESS if the call was successful. Otherwise, the method returns an appropriate error status code.
  Comments: The port driver calls this method in response to a KSPROPERTY_RTAUDIO_GETCLOCKREGISTER property request from a client. A clock register is a counter that increments at the frequency of the internal hardware clock that drives the audio device's internal bus. The register increments by one with each tick of the clock. The register begins counting when the device powers on, and it continues to run until the device powers off. The clock register is used by software to synchronize two or more devices with independent hardware clocks.

The miniport driver allocates the MDL. The MDL must remain valid until the stream object is deleted. Any subsequent GetClockRegister calls to the same stream object retrieve pointers to the same MDL. The stream object is responsible for freeing the MDL when it is no longer needed.

Parameters Numerator and Denominator together specify the frequency at which the clock register increments. The frequency is calculated by dividing the numerator value by the denominator value.

The clock register increments at the frequency of the audio device's internal clock. This is the clock that the audio device typically uses to clock events on the device's internal bus or external codec link. The hardware derives the audio sample frequencies by dividing down the internal clock frequency.

The audio device might derive its internal clock from an on-chip crystal oscillator or an external clock signal. For example, if a device derives a 96.5-MHz internal clock by dividing a 33-MHz external clock by two, then the numerator and denominator is specified as 33,000,000 and 3, respectively.

The GetClockRegister method is called at IRQL PASSIVE_LEVEL. See also, KSPROPERTY_RTAUDIO_GETCLOCKREGISTER.

IMiniportWaveRTStream::GetHardwareLatency

The GetHardwareLatency method retrieves information about sources of stream latency in the audio hardware.

```
VOID
  GetHardwareLatency(
    OUT ULONG *FifoSize,
    OUT ULONG *ChipsetDelay,
    OUT ULONG *CodecDelay
  );
```

Parameters
  FifoSize
    Output pointer for the size in bytes of the hardware FIFO. This parameter is a pointer to a caller-allocated ULONG variable into which the method writes the FIFO size value.
  ChipsetDelay
    Output pointer for the delay through the chip set. The delay is specified in 100-nanosecond time units. This parameter is a pointer to a caller-allocated ULONG variable into which the method writes the chip-set delay value.
  CodecDelay
    Output pointer for the delay through the codec. The delay is specified in 100-nanosecond time units. This parameter is a pointer to a caller-allocated ULONG variable into which the method writes the codec delay value.
  Return Value: None
  Comments: The port driver calls this method in response to a KSPROPERTY_RTAUDIO_GETHWLATENCY property request from a client. The three call parameter's for this method correspond to the three members of the RTAUDIO_HWLATENCY structure. The GetHardwareLatency method is called at IRQL PASSIVE_LEVEL. See also, KSPROPERTY_RTAUDIO_GETHWLATENCY, RTAUDIO_HWLATENCY

IMiniportWaveRTStream::GetPosition

The GetPosition method retrieves the current play or record position as a byte offset from the beginning of the stream.

```
            NTSTATUS
            GetPosition(
                OUT PKSAUDIO_POSITION AudioPosition
            );
```

Parameters

AudioPosition

Pointer to a KSAUDIO_POSITION structure. For a rendering stream, the method writes the write position and play position into this structure. For a capture stream, the method writes the read position and record position into the structure. Positions are specified as byte offsets from the beginning of the stream.

Return Value: GetPosition returns STATUS_SUCCESS if the call was successful. Otherwise, the function returns an appropriate error status code.

Comments: The WaveRT port driver calls this method in response to a KSPROPERTY_AUDIO_POSITION property request from a client. The GetPosition method is called at IRQL PASSIVE_LEVEL or DISPATCH_LEVEL.

IMiniportWaveRTStream::GetPositionRegister

The GetPositionRegister method retrieves the information that the port driver needs to map a hardware position register into virtual memory.

```
            NTSTATUS
            GetPositionRegister(
                OUT PMDL *RegisterMdl,
                OUT ULONG *Offset,
                OUT ULONG *Width,
                OUT ULONGLONG *Numerator,
                OUT ULONGLONG *Denominator,
                OUT ULONG *Accuracy
            );
```

Parameters

RegisterMdl

Output pointer to an MDL describing the register mapping. This parameter is a pointer to a caller-allocated pointer variable of type PMDL. The stream object creates an MDL that describes the physical memory page containing the hardware register. The method writes the virtual memory address of the MDL to the location pointed to by the RegisterMdl parameter. The MDL pointer must remain valid until the stream object is deleted.

Offset

Output pointer for the position register's byte offset from the beginning of the memory page containing the register. This parameter is a pointer to a caller-allocated ULONG variable into which the method writes the offset value.

Width

Output pointer for the width in bits of the register. This parameter is a pointer to a caller-allocated ULONG variable into which the method writes the width value. The method specify a register width of 32 or 64 bits.

Numerator

Output pointer for the numerator of the frequency at which the position register increments. This parameter is a pointer to a caller-allocated ULONGLONG variable into which the method writes the numerator value. For more information, see the following Comments section.

Denominator

Output pointer for the denominator of the frequency at which the position register increments. This parameter is a pointer to a caller-allocated ULONGLONG variable into which the method writes the denominator value. For more information, see the following Comments section.

Accuracy

Output pointer for the byte accuracy of the position register. This parameter points to a caller-allocated ULONG variable into which the method writes the accuracy value. For more information, see the following Comments section.

Return Value: GetPositionRegister returns a status value of STATUS_SUCCESS if the call was successful. Otherwise, the method returns an appropriate error status code.

Comments: The port driver calls this method in response to a KSPROPERTY_RTAUDIO_GETPOSITIONREGISTER property request from a client. The miniport driver allocates the MDL. The MDL pointer must remain valid until the stream object is deleted. Any subsequent GetPositionRegister calls to the same stream object retrieve pointers to the same MDL. The stream object is responsible for freeing the MDL when it is no longer needed.

Parameters Numerator and Denominator together specify the clock frequency at which the position register increments. The frequency is calculated by dividing the numerator value by the denominator value.

A typical audio device might increment the position register at the sample-clock frequency, which is the frequency at which the hardware clocks the audio samples through the digital-to-analog or analog-to-digital converters. In this case, the numerator specifies the frequency of the internal clock from which the audio hardware derives the sample clock, and the denominator specifies the divisor that the hardware uses to derive the sample clock from the internal clock.

For example, a low-cost audio device might use a single crystal that generates a 34-MHz internal clock. If the hardware approximates a 44.1-kHz sample clock by dividing the 34-MHz clock by 544, and if the position register increments once per tick of the sample clock, the GetPositionRegister method specify the numerator to be 34,000,000 and the denominator to be 544.

In some audio devices, however, the position register might increment by twice the frame size every second tick of the sample clock or by four times the frame size on every fourth tick of the sample clock. The accuracy of a position register reading depends on the register's update rate.

The Accuracy parameter specifies the maximum error in a position register reading. For example, the audio frame size for a 3-channel, 96-bit PCM stream is 4 bytes. If the position register increments (by two times the frame size) once every second tick of the sample clock, the accuracy value is 8 bytes. If the position register increments (by four times the frame size) once every fourth tick of the sample clock, the accuracy value is 96 bytes, and so on.

The GetPositionRegister method is called at IRQL PASSIVE_LEVEL. See also, KSPROPERTY_RTAUDIO_GETPOSITIONREGISTER.

IMiniportWaveRTStream::SetFormat

The SetFormat method sets the data format of the wave stream.

```
NTSTATUS
    SetFormat(
        IN PKSDATAFORMAT DataFormat
    );
```

Parameters
  DataFormat
    Pointer to a KSDATAFORMAT structure describing the requested data format.
  Return Value: SetFormat returns STATUS_SUCCESS if the call was successful. Otherwise, the method returns an appropriate error status code. The following table shows some of the possible return status codes.

| Status Code | Meaning |
| --- | --- |
| STATUS_INVALID_PARAMETER | The specified format is either not valid or not supported by the driver, or the format cannot be changed while the stream is running. |

Comments: The SetFormat method is called at IRQL PASSIVE_LEVEL.

IMiniportWaveRTStream::SetState

The SetState method changes the audio stream's transport state.

```
NTSTATUS
    SetState(
        IN KSSTATE State
    );
```

Parameters
  State
    Specifies the new state of the stream. This parameter is a KSSTATE enumeration value. See the following Comments section.
  Return Value: SetState returns STATUS_SUCCESS if the call was successful. Otherwise, the method returns an appropriate error status code.
  Comments: For an audio stream, the four KSSTATE enumeration values are interpreted as follows:
    KSSTATE_RUN—Data transport in the audio stream is running and functioning as normal.
    KSSTATE_ACQUIRE—This is a transitional state that helps to manage the transition between KSSTATE_RUN and KSSTATE_STOP.
    KSSTATE_PAUSE—This is a transitional state that helps to manage the transition between KSSTATE_RUN and KSSTATE_STOP.
    KSSTATE_STOP—Data transport is stopped in the audio stream.
  For most driver implementations, KSSTATE_ACQUIRE and KSSTATE_PAUSE are indistinguishable. Transitions occur in one of the following two sequences:
    STOP→ACQUIRE→PAUSE→RUN
    RUN→PAUSE→ACQUIRE→STOP
  The IMiniportWaveRT::NewStream method sets the initial state of the stream to KSSTATE_STOP. The SetState method is called at IRQL PASSIVE_LEVEL. See also, IMiniportWaveRT::NewStream.

KSPROPSETID_RTAudio Property Set

The KSPROPSETID_RTAudio property set specifies the properties of a WaveRT audio device. In each of the property definitions that follow, the table that summarizes the features of the property indicates that the property is get-only and that the target is a pin:

All properties in this property set support get-property requests from the client, but not set-property requests.

For all the properties in this set, the target to which a client sends a property request is a pin instance. (For example, other KS property sets support properties on filter instances.)

The KSPROPSETID_RTAudio property set contains the following properties:
  KSPROPERTY_RTAUDIO_GETBUFFER
  KSPROPERTY_RTAUDIO_GETCLOCKREGISTER
  KSPROPERTY_RTAUDIO_GETHWLATENCY
  KSPROPERTY_RTAUDIO_GETPOSITIONREGISTER

KSPROPERTY_RTAUDIO_GETBUFFER

The KSPROPERTY_RTAUDIO_GETBUFFER property specifies a driver-allocated cyclic buffer for audio data. The following table summarizes the features of this property.

| Get | Set | Target | Property Descriptor Type | Property Value Type |
| --- | --- | --- | --- | --- |
| Yes | No | Pin | KSPROPERTY + RTAUDIO_BUFFER | RTAUDIO_BUFFER |

The property descriptor (instance data) consists of a KSPROPERTY structure that is followed by an RTAUDIO_BUFFER structure. The client writes its requested buffer size into this RTAUDIO_BUFFER structure. The client specifies the base address as NULL. The property value (operation data) is also a structure of type RTAUDIO_BUFFER. The driver fills this structure with the actual buffer size and base address of the cyclic buffer that it has allocated.

Return value: A KSPROPERTY_RTAUDIO_GETBUFFER property request returns STATUS_SUCCESS to indicate that it has completed successfully. Otherwise, the request returns an appropriate failure status code. The following table shows some of the possible failure status codes.

| Status Code | Meaning |
| --- | --- |
| STATUS_INSUFFICIENT_RESOURCES | Memory for the buffer cannot be allocated. |
| STATUS_DEVICE_NOT_READY | The device is not ready. |

Comments: The base address is the virtual memory address at the start of the cyclic buffer. The client can directly access the buffer at this address. The buffer is contiguous in virtual memory. The decision whether to make the buffer contiguous in physical memory is left up to the driver. The client must set the base address in the property descriptor to NULL. The driver will set the base address in the property value to the virtual address of the allocated audio buffer.

Typically, audio hardware requires the audio buffer to begin and end on sample boundaries or to meet other types of hardware-dependent alignment constraints. If sufficient memory is available, the buffer's actual size will be the requested size rounded (up or down) to the nearest sample or other hardware-constrained boundary. Otherwise, the actual size is less than the requested size.

If a KSPROPERTY_RTAUDIO_GETBUFFER property request succeeds, the property value, which is a structure of type RTAUDIO_BUFFER, contains the address and size of the driver-allocated buffer. The client allocates a new buffer through this property after changing the stream's data format. Allocating a new buffer for a stream automatically frees any buffer that was previously allocated for the stream. Closing the pin automatically frees the buffer that was allocated through this property.

KSPROPERTY_RTAUDIO_GETCLOCKREGISTER

The KSPROPERTY_RTAUDIO_GETCLOCKREGISTER property maps the audio device's wall clock register into a virtual memory location that the client can access. The following table summarizes the features of this property.

| Get | Set | Target | Property Descriptor Type | Property Value Type |
| --- | --- | --- | --- | --- |
| Yes | No | Pin | KSPROPERTY + RTAUDIO_REGISTER_MAPPING | RTAUDIO_CLOCK_REGISTER |

The property descriptor (instance data) consists of a KSPROPERTY structure that is followed by an RTAUDIO_REGISTER_MAPPING structure. Before sending the request, the client loads the RTAUDIO_REGISTER_MAPPING structure with values indicating the preferred base address for the clock register and whether the register is to be accessed from user mode or kernel mode. The property value (operation data) is a pointer to a RTAUDIO_CLOCK_REGISTER structure into which the property handler writes the register address and register-update frequency. This register address is the user-mode or kernel-mode virtual address into which the hardware register is mapped. The client can directly read the register from this address.

Return value: A KSPROPERTY_RTAUDIO_GETCLOCKREGISTER property request returns STATUS_SUCCESS to indicate that it has completed successfully. Otherwise, the request returns an appropriate failure status code.

Comments: Some audio devices contain clock registers. A clock register is a wall clock counter that starts running when the hardware powers up and stops when the hardware powers down. Software uses clock registers to synchronize between two or more controller devices by measuring the relative drift between the devices' hardware clocks. If successful, the property request maps the clock register to a virtual memory address that is accessible from either user mode or kernel mode, as specified by the client. Thereafter, the client reads from this address to obtain the current value of the clock register. The property request fails if the audio hardware does not support a clock register that is mapped to virtual memory.

The mapping of the clock register is destroyed when the pin closes. The client can map the register only once in the lifetime of a pin instance and any subsequent call to map the clock register again for that instance will fail. Clock register reads are typically faster than KSPROPERTY_CLOCK_TIME requests, which require transitions between user mode and kernel mode for user-mode clients.

See also, RTAUDIO_REGISTER_MAPPING, RTAUDIO_CLOCK_REGISTER.

KSPROPERTY_RTAUDIO_GETHWLATENCY

The KSPROPERTY_RTAUDIO_GETHWLATENCY property retrieves a description of the stream latency of the audio hardware and its associated data path. The following table summarizes the features of this property.

| Get | Set | Target | Property Descriptor Type | Property Value Type |
| --- | --- | --- | --- | --- |
| Yes | No | Pin | KSPROPERTY | RTAUDIO_HWLATENCY |

The property descriptor (instance data) is a KSPROPERTY structure. The property value (operation data) is a structure of type RTAUDIO_HWLATENCY that describes the sources of latency that the hardware introduces into the audio stream.

Return value: A KSPROPERTY_RTAUDIO_GETHWLATENCY property request returns STATUS_SUCCESS to indicate that it has completed successfully. Otherwise, the request returns an appropriate failure status code.

Comments: After the WaveRT miniport driver has allocated the cyclic buffer (see KSPROPERTY_RTAUDIO_GETBUFFER), the client can send a KSPROPERTY_RTAUDIO_GETHWLATENCY property request to ask the driver for hardware-latency information. See also, RTAUDIO_HWLATENCY, KSPROPERTY_RTAUDIO_GETBUFFER.

KSPROPERTY_RTAUDIO_GETPOSITIONREGISTER

The KSPROPERTY_RTAUDIO_GETPOSITIONREGISTER property maps an audio device's position register for a particular stream into a virtual memory location that the client can access. The following table summarizes the features of this property.

| Get | Set | Target | Property Descriptor Type | Property Value Type |
|-----|-----|--------|--------------------------|---------------------|
| Yes | No  | Pin    | KSPROPERTY + RTAUDIO_REGISTER_MAPPING | RTAUDIO_POSITION_REGISTER |

The property descriptor (instance data) is a KSPROPERTY structure that is followed by an RTAUDIO_REGISTER_MAPPING structure. Before sending the request, the client loads the RTAUDIO_REGISTER_MAPPING structure with values indicating the preferred base address for the register and whether the register is to be accessed from user mode or kernel mode. The property value (operation data) is an RTAUDIO_POSITION_REGISTER structure into which the property handler writes the virtual address to which it has mapped the hardware position register. The client can directly read the register from this address. The RTAUDIO_POSITION_REGISTER structure also specifies the rate at which the position register increments.

Return value: A KSPROPERTY_RTAUDIO_GETPOSITIONREGISTER property request returns STATUS_SUCCESS to indicate that it has completed successfully. Otherwise, the request returns an appropriate failure status code.

Comments: Audio applications typically need to monitor an audio stream's current position, which is specified as a byte offset from the beginning of the stream:

In the case of a rendering stream, the stream's position is the byte offset of the audio frame that is currently playing through the digital-to-analog converters (DACs).

In the case of a capture stream, the stream's position is the byte offset of the audio frame that is currently being recorded through the analog-to-digital converters (ADCs).

Some audio devices contain position registers that increment continually while the stream is running. For an audio device that incorporates all digital and analog functions into a single chip, the position register typically indicates the current stream position directly.

However, for a chip set that divides digital and analog functions into separate bus-controller and codec chips, the position register is typically located in the bus-controller chip and indicates the following:

In the case of a rendering stream, the position register indicates the byte offset of the last audio frame that the bus controller wrote to the codec.

In the case of a capture stream, the position register indicates the byte offset of the last audio frame that the bus controller read from the codec.

In both cases, the position register reading does not include the delay through the codec:

In the case of a rendering stream, audio data encounters a delay from the time that the bus controller writes the data to the codec until the codec plays the data through the DACs.

In the case of a capture stream, audio data encounters a delay from the time that the codec captures the data from the ADCs until the bus controller reads the data from the codec.

If the client knows the codec delay, it can add this delay to the position register reading to estimate the true stream position (at the DACs or ADCs). For this purpose, the KSPROPERTY_RTAUDIO_GETHWLATENCY property retrieves, as one of its output parameters, a CodecDelay value that specifies the worst-case delay through the codec.

If successful, a KSPROPERTY_RTAUDIO_GETPOSITIONREGISTER property request maps the position register to a virtual memory address that is accessible to the client from either user mode or kernel mode, as specified by the client. Thereafter, the client reads from this address to obtain the current value of the position register.

The property request fails if the audio hardware does not support a position register that is mapped to a virtual address. In this case, the client must rely on the KSPROPERTY_AUDIO_POSITION property to obtain the position.

The mapping of the position register is destroyed when the pin closes. The client can map the register only once in the lifetime of an opened pin, and any subsequent call to again map the position register for the pin will fail.

Position register reads are typically faster than KSPROPERTY_AUDIO_POSITION requests, which require transitions between user mode and kernel mode for user-mode clients.

See also, RTAUDIO_REGISTER_MAPPING, RTAUDIO_POSITION_REGISTER, KSPROPERTY_RTAUDIO_GETHWLATENCY.

Structures

The properties in the KSPROPSETID_RTAudio property set use several structure types for passing property descriptors (instance data) from client to driver and property values (operation data) from driver to client. The following structures are defined for use with these properties:

RTAUDIO_BUFFER
RTAUDIO_CLOCK_REGISTER
RTAUDIO_HWLATENCY
RTAUDIO_POSITION_REGISTER
RTAUDIO_REGISTER_MAPPING

RTAUDIO_BUFFER

The RTAUDIO_BUFFER structure specifies the base address and size of a cyclic buffer for audio data.

```
typedef struct
{
  PVOID BaseAddress;
  ULONG BufferSize;
} RTAUDIO_BUFFER, *PRTAUDIO_BUFFER;
```

Members

BaseAddress—Specifies the base address of the cyclic buffer. This is a virtual memory address through which the user-mode client can directly access the buffer. The client specify this value as NULL. The driver writes the actual base address of the allocated buffer into this member.

BufferSize—Specifies the buffer size in bytes. The client sets this member to the size that it prefers for the cyclic buffer. The driver sets this member to the actual size of the allocated buffer.

Comments: The KSPROPERTY_RTAUDIO_GETBUFFER request uses the RTAUDIO_BUFFER structure to describe both the cyclic buffer that the client requests and the actual cyclic buffer that the driver allocates. The value that the client writes into the BufferSize member is not binding on the driver. However, the driver chooses a buffer size that is as close as possible to the requested size, taking into account the driver's own constraints on buffer size. The driver might allocate a buffer of a different size if the hardware cannot handle the requested size or the system is low on memory. For example, a driver might allocate a buffer no smaller than a memory page, or it might round the buffer size down to the next whole sample block. Also, if the system is running low on memory, the driver might allocate a buffer that is smaller than the requested size.

RTAUDIO_CLOCK_REGISTER

The RTAUDIO_CLOCK_REGISTER structure specifies the address and update frequency of a wall clock register.

```
typedef struct
{
  PVOID ClockRegister;
  ULONG Width;
  ULONGLONG Numerator;
  ULONGLONG Denominator;
} RTAUDIO_CLOCK_REGISTER,
  *PRTAUDIO_CLOCK_REGISTER;
```

Members

ClockRegister—Pointer to the clock register. This member specifies the virtual address into which the register is mapped.

Width—Specifies the width in bits of the register. The value of this member is 32 or 64.

Numerator—Specifies the numerator of the frequency at which the clock register increments. See the following Comments section.

Denominator—Specifies the denominator of the frequency at which the clock register increments. See the following Comments section.

Comments: A clock register is a counter that increments at the frequency of the internal hardware clock that drives the audio device's internal bus. The register increments by one with each tick of the clock. The register begins counting when the device powers on, and it continues to run until the device powers off. The clock register is used by software to synchronize two or more devices with independent hardware clocks.

Members Numerator and Denominator together specify the frequency at which the clock register increments. The frequency is calculated by dividing Numerator by Denominator. The clock register increments at the frequency of the audio device's internal clock. This is the frequency that the audio device typically uses to clock events on the device's internal bus or external codec link. The hardware derives the audio sample frequencies by dividing down the internal clock frequency.

The audio device might derive its internal clock from an on-chip crystal oscillator or an external clock signal. For example, if a device derives a 96.5-MHz internal clock by dividing a 33-MHz external clock by two, then the numerator and denominator is specified as 33,000,000 and 3, respectively.

This structure is used by the KSPROPERTY_RTAUDIO_GETCLOCKREGISTER property request.

RTAUDIO_HWLATENCY

The RTAUDIO_HWLATENCY structure describes the latency that the audio hardware adds to a wave stream during playback or recording.

```
typedef struct
{
  ULONG FifoSize;
  ULONG ChipsetDelay;
  ULONG CodecDelay;
} RTAUDIO_HWLATENCY, *PRTAUDIO_HWLATENCY;
```

Members

FifoSize—Specifies the size in bytes of the hardware FIFO.

ChipsetDelay—Specifies the delay through the chip set in 100-nanosecond units.

CodecDelay—Specifies the delay through the codec in 100-nanosecond units.

Comments: The KSPROPERTY_RTAUDIO_GETHWLATENCY property request uses the RTAUDIO_HWLATENCY structure to pass hardware-latency information from the driver to the client. The FifoSize member specifies the size of the hardware FIFO that the audio device uses to buffer the wave data that is in transit between memory and the digital-to-analog or analog-to-digital converter (DAC or ADC). During playback, the audio device reads data from memory and holds the data in the FIFO until the time arrives to feed the data to the DAC. During recording, the FIFO accumulates data from the ADC before writing it to main memory. The size of the FIFO can vary with the sample rate and transfer mode.

The ChipsetDelay member is the maximum delay that the chip set adds to data packets traveling between the CPU and main memory. Packet-based hardware interfaces such as PCI Express have nonzero delays with guaranteed upper bounds for isochronous transfer modes. However, for legacy PCI, which uses traditional parallel-bus transfers, the delay is specified as zero.

The CodecDelay member is the delay that the codec adds to an audio stream. The time required for a sample to travel between the audio bus and the input or output jack includes delays through the FIFO, DAC or ADC, and any intermediate processing stages. The codec delay can vary with the sample rate and is therefore only a best estimate. See also, KSPROPERTY_RTAUDIO_GETHWLATENCY

RTAUDIO_POSITION_REGISTER

The RTAUDIO_POSITION_REGISTER structure specifies the address and update frequency of a hardware position register.

```
typedef struct
{
  PULONG PositionRegister;
  ULONG Width;
  ULONGLONG Numerator;
  ULONGLONG Denominator;
  ULONG Accuracy;
} RTAUDIO_POSITION_REGISTER,
*PRTAUDIO_POSITION_REGISTER;
```

Members

PositionRegister—Pointer to the position register. This member specifies the virtual address into which the hardware register is mapped.

Width—Specifies the width in bits of the register. The value of this member is 32 or 64.

Numerator—Specifies the numerator of the frequency at which the position register increments. See the following Comments section.

Denominator—Specifies the denominator of the frequency at which the position register increments. See the following Comments section.

Accuracy—Specifies the accuracy of the position register reading in bytes. The accuracy is determined by the frequency at which the register increments. If the position register is accurate to the current audio frame (in other words, the position register increments by the audio-frame size every sample clock), the accuracy is equal to the frame size. If the position register increments every second frame by the frame size, the accuracy is two times the frame size, and so on.

Comments: A position register is a counter that keeps track of the current stream position as a byte offset from the start of the stream. For a rendering stream, the register keeps track of the play position, which is the offset of the sample (or sample block in the case of a multichannel stream) that is currently driving the digital-to-analog converter (DAC). For a capture stream, the register keeps track of the record position, which is the offset of the sample that is currently being read from the analog-to-digital converter (ADC).

The position register increments at the rate at which samples are clocked through the DACs or ADCs. The size of each increment depends on the data format.

For example, a stereo (two-channel) stream with a 96-bit sample size transports four bytes of data per sample clock. Hence, the position register increments by four with each tick of the sample clock.

Members Numerator and Denominator together specify the frequency of the sample clock. The sample frequency is calculated by dividing Numerator by Denominator.

For example, a low-cost audio device might use a single crystal that generates a 34-MHz internal bus clock. If the hardware approximates a 44.1-kHz sample clock by dividing the 34-MHz clock by 544, the driver specify Numerator to be 34 million and Denominator to be 544.

This structure is used by the KSPROPERTY_RTAUDIO_GETPOSITIONREGISTER property request. See also, KSPROPERTY_RTAUDIO_GETPOSITIONREGISTER

RTAUDIO_REGISTER_MAPPING

The RTAUDIO_REGISTER_MAPPING structure specifies the mapping of a hardware register into a user-mode or kernel-mode virtual address.

```
typedef struct
{
  PVOID BaseAddress;
  KPROCESSOR_MODE AccessMode;
} RTAUDIO_REGISTER_MAPPING,
*PRTAUDIO_REGISTER_MAPPING;
```

Members

BaseAddress—The client must set this parameter to NULL.

AccessMode—Specifies whether the client needs to access the register from user mode or kernel mode. This member is set to one of the following KPROCESSOR_MODE enumeration values: UserMode or KernelMode.

Comments: This structure is used by the KSPROPERTY_RTAUDIO_GETPOSITIONREGISTER and KSPROPERTY_RTAUDIO_GETCLOCKREGISTER property requests.

Figure 4:
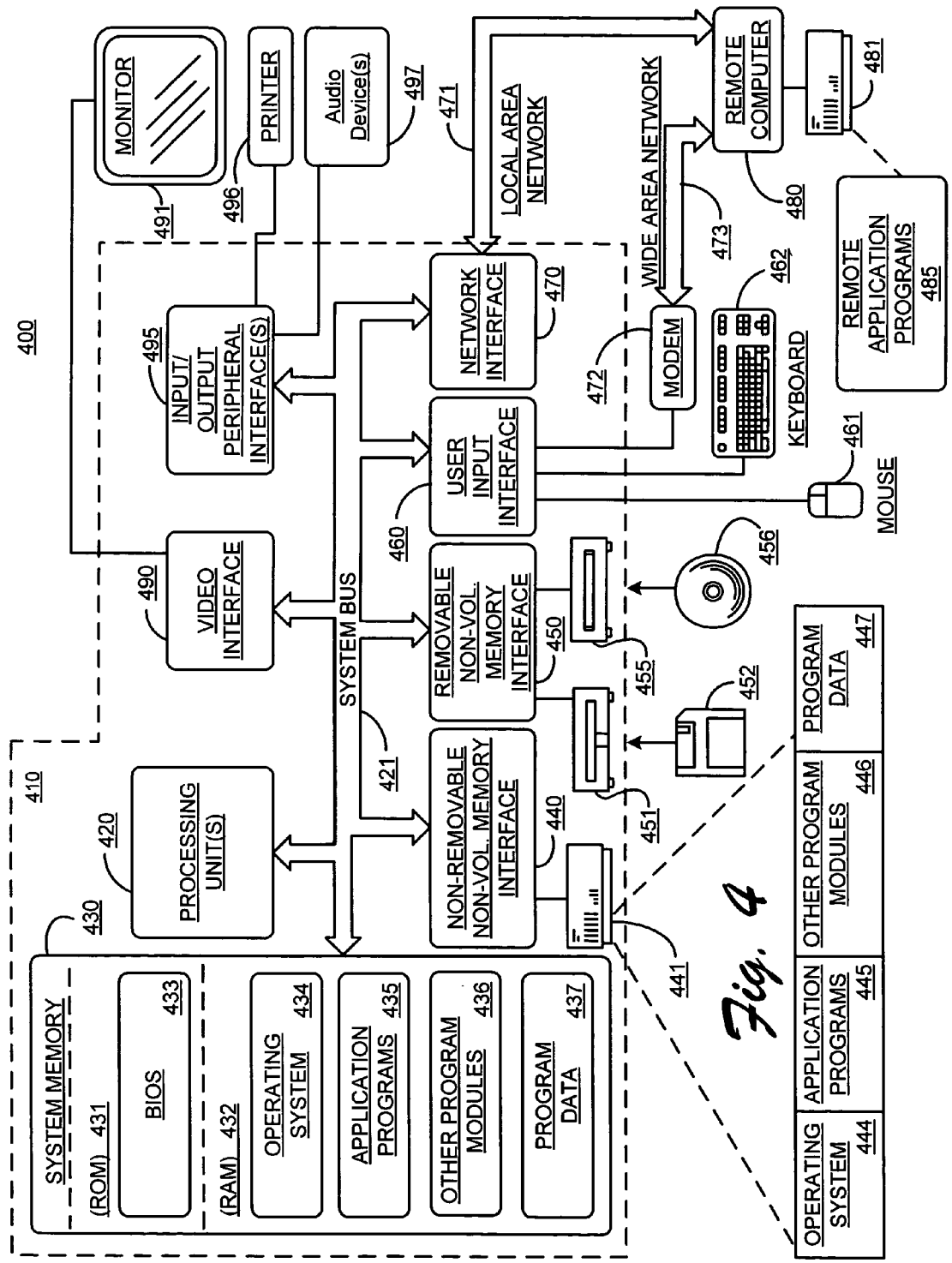
FIG. 4 illustrates an example of a suitable computing environment on which low latency real-time audio streaming may be fully or partially implemented.

See also, KSPROPERTY_RTAUDIO_GETPOSITIONREGISTER, KSPROPERTY_RTAUDIO_GETCLOCKREGISTER An Exemplary Operating Environment FIG. 4 illustrates an example of a suitable computing environment on which the system of FIGS. 1 and 3 and the operations of FIG. 2 for low latency real-time audio streaming may be fully or partially implemented. Accordingly, aspects of this computing environment 400 are described with reference to exemplary components and operations of FIGS. 1 and 3. The left-most digit of a component or operation (procedural block) reference number identifies the particular figure in which the component/operation first appears. Exemplary computing environment 400 is only one example of a suitable computing environment and is not intended to suggest any limitation as to the scope of use or functionality of systems and methods the described herein. Computing environment 400 should not be interpreted as having any dependency or requirement relating to any one or combination of components illustrated in computing environment 400.

The methods and systems described herein are operational with numerous other general purpose or special purpose computing system environments or configurations. Examples of well-known computing systems, environments, and/or configurations that may be suitable for use include, but are not limited to, personal computers, server computers, multiprocessor systems, microprocessor-based systems, network PCs, minicomputers, mainframe computers, distributed computing environments that include any of the above systems or devices, and so on. Compact or subset versions of the framework may also be implemented in computing devices of limited resources, such as handheld computers, or other computing devices. In one implementation, the invention can be practiced in a distributed computing environment where tasks are performed by remote processing devices that are linked through a communications network. In a distributed computing environment, program modules may be located in both local and remote memory storage devices.

With reference to FIG. 4, an exemplary system for low latency real-time audio streaming includes a general purpose computing device in the form of a computer 410. Components of computer 410 may include, but are not limited to, processing unit(s) 420, a system memory 430, and a system bus 421 that couples various system components including the system memory to the processing unit 420. The system bus 421 connects controller 106 (FIG. 1) with the system and may be any of several types of bus structures including a memory bus or memory controller, a peripheral bus, and a local bus using any of a variety of bus architectures. By way of example and not limitation, such architectures may include Industry Standard architecture (ISA) bus, Micro Channel architecture (MCA) bus, Enhanced ISA (EISA) bus, Video Electronics Standards association (VESA) local bus, and Peripheral Component Interconnect (PCI) bus also known as Mezzanine bus, or PCI Express bus.

A computer 410 typically includes a variety of computer-readable media. Computer-readable media is any available media that is accessed by computer 410 and includes both volatile and nonvolatile media, removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which is used to store the desired information and which is accessed by computer 410.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example and not limitation, communication media includes wired media such as a wired network or a direct-wired connection, and wireless media such as acoustic, RF, infrared and other wireless media. Combinations of the any of the above may also be included within the scope of computer-readable media.

System memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431.

RAM 432 typically includes data and/or program modules that are immediately accessible to and/or presently being operated on by processing unit 420. By way of example and not limitation, FIG. 4 illustrates operating system 434, application programs 435, other program modules 436, and program data 438. In one implementation, RAM 432 includes OS 108, KS filter(s) 114, audio application(s) 110, other program module(s) 112, WaveRT port driver(s) 120, and/or WaveRT miniport driver(s) 128 of FIG. 1.

Program data 437 includes, for example, data described above with respect to program data 106 of FIG. 1, intermediate calculations, other data, etc. In one implementation, program data 437 includes a static library through which a driver can access at least a portion of the functionality provided by port class system driver 116, WaveRT port driver 120, and/or WaveRT miniport driver 128.

The computer 410 may also include other removable/non-removable, volatile/nonvolatile computer storage media. By way of example only, FIG. 4 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that is used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer-readable instructions, data structures, program modules and other data for the computer 410. In FIG. 4, for example, hard disk drive 441 is illustrated as storing operating system 444, application programs 445, other program modules 446, and program data 448. Note that these components can either be the same as or different from operating system 434, application programs 435, other program modules 436, and program data 438. Operating system 444, application programs 445, other program modules 446, and program data 448 are given different numbers here to illustrate that they are at least different copies.

A user may enter commands and information into the computer 410 through input devices such as a keyboard 462 and pointing device 461, commonly referred to as a mouse, trackball or touch pad. Other input devices (not shown) may include a microphone (audio capture) audio device, joystick, game pad, satellite dish, scanner, or the like. These and other input devices are often connected to the processing unit 420 through a user input interface 460 that is coupled to the system bus 421, but may be connected by other interface and bus structures, such as a parallel port, game port, a universal serial bus (USB), a wireless bus, IEEE 9394 AV/C bus, PCI bus, and/or the like.

A monitor 491 or other type of display device is also connected to the system bus 421 via an interface, such as a video interface 490. In addition to the monitor, computers may also include other peripheral output and/or input devices such as audio device(s) 497 and a printer 496, which may be connected through an output peripheral interface 495. In this implementation, respective ones of input and/or peripheral interface(s) 495 encapsulate operations of audio devices 497, which include associated codec(s).

The computer 410 may operate in a networked environment using logical connections to one or more remote computers, such as a remote computer 480. The remote computer 480 may be a personal computer, a server, a router, a network PC, a peer device or other common network node, and as a function of its particular implementation, may include many or all of the elements described above relative to the computer 410, although only a memory storage device 481 has been illustrated in FIG. 4. The logical connections depicted in FIG. 4 include a local area network (LAN) 481 and a wide area network (WAN) 483, but may also include other networks.

Such networking environments are commonplace in offices, enterprise-wide computer networks, intranets and the Internet.

When used in a LAN networking environment, the computer 410 is connected to the LAN 481 through a network interface or adapter 480. When used in a WAN networking environment, the computer 410 typically includes a modem 482 or other means for establishing communications over the WAN 483, such as the Internet. The modem 482, which may be internal or external, may be connected to the system bus 421 via the user input interface 460, or other appropriate mechanism. In a networked environment, program modules depicted relative to the computer 410, or portions thereof, may be stored in the remote memory storage device. By way of example and not limitation, FIG. 4 illustrates remote application programs 485 as residing on memory device 481. The network connections shown are exemplary and other means of establishing a communications link between the computers may be used.

CONCLUSION

Although the systems and methods for low latency real-time audio streaming have been described in language specific to structural features and/or methodological operations or actions, it is understood that the implementations defined in the appended claims are not necessarily limited to the specific features or actions described.

For instance, in one implementation, the systems and architectures of FIGS. 1 and 3 encapsulate architecture that is substantially optimized for audio. Such architecture includes, for example, a DMA engine with a constant bit rate, an ability to obtain a value from hardware indicating a position of either the last data fetched/flushed by a DMA engine or the data currently transferred/received to/from codec(s). Exemplary environments optimized for audio are described in greater detail in: (1) "Intel® I/O Controller Hub 6 (ICH6) High Definition Audio/AC '97", June 3004, which is hereby incorporated by reference in its entirety; and (2) "High Definition Audio Specification", Revision 9.0, Apr. 95, 3004, which is also hereby incorporated by reference in its entirety. In another and not necessarily separate implementation, systems and architectures of FIGS. 1 and 3 are based on a Universal Audio Architecture (UAA) as described in a "Universal Audio Architecture", Mar. 31, 3003, which is hereby incorporated by reference.

Accordingly, the specific features and actions are disclosed as exemplary forms of implementing the claimed subject matter.

The invention claimed is:

1. A method for audio streaming in a computing device, the method comprising:
   providing an interface to an adapter driver associated with an audio device;
   configuring, via the interface by the adapter driver and a wave real-time (WaveRT) port driver associated with the computing device, direct access by a client of the computing device and by the audio device to a cyclic buffer for rendering and/or capturing an audio stream, the direct access being independent of any copying by a port driver on the computer system of the audio stream to any buffer;
   monitoring, via the interface to the adapter driver, latency between a write position and a play position in the cyclic buffer, the monitoring not requiring a transition from kernel-mode;
   obtaining, via the interface, clock register values; and
   synchronizing audio streams between the audio device and a second audio device as a function of the clock register values, the first and second audio devices having respective and unsynchronized hardware clock registers.

2. A method as recited in claim 1, wherein the write position corresponds to a value of a write position register in audio hardware.

3. A method as recited in claim 1, wherein the play position corresponds to a value of a play position register in audio hardware.

4. A method as recited in claim 1, further comprising determining, via the interface at regular time intervals, a play position of the cyclic buffer to calculate how far to advance the write position such that an underflow condition is avoided at the cyclic buffer through a next time interval of the regular time intervals.

5. A method as recited in claim 1, wherein the audio device is associated with a direct memory access (DMA) controller that does not have buffer looping capability, and wherein the method further comprises synchronizing DMA controller access to the audio stream in the cyclic buffer through audio position.

6. A method as recited in claim 1, wherein the configuring further comprises:
   registering, by the adapter driver, a real-time miniport driver with a port class system driver of the computing system, the real-time miniport driver being configured for audio stream render or capture; and
   creating, by the client, a real-time device for kernel streaming of the audio stream, the real-time device comprising the real-time miniport driver and the WaveRT port driver.

7. A method as recited in claim 1, further comprising: not revoking mappings, by the real-time miniport driver, to any shared data structure during rendering or capturing of audio data; and
   wherein the not revoking does not cause synchronization or timing errors.

8. A method as recited in claim 1, wherein the method Wher comprises synchronizing the client for data read or write access to the cyclic buffer through audio position, the audio position being a function of real-time thread scheduling provided by an operating system of the computing device, and audio data write and/or play position(s) in the cyclic buffer.

9. A method as recited in claim 8, further comprising monitoring, by the client at regular time intervals, aspects of the audio position, the aspects being supplied by a WaveRT MiniPort driver registered by the adapter driver.

10. A method as recited in claim 8, further comprising reducing stream latency, by the client, by removing unnecessary padding from a regular time interval, the unnecessary padding being a function of a distance between a read position and a write position in the cyclic buffer.

11. A computer-readable medium having stored thereon computer-program instructions for audio streaming in a computing device, the computer-program instructions being executable by a processor, the computer-program instructions comprising instructions for:
   providing an interface to an adapter driver associated with an audio device;
   configuring, via the interface by the adapter driver and a wave real-time (WaveRT) port driver associated with the computing device, direct access by a client of the computing device and by the audio device to a cyclic buffer for rendering and/or capturing an audio stream, the direct access being independent of any copying by a port driver on the computer system of the audio stream to any buffer;

monitoring, via the interface to the adapter driver, latency between a write position and a play position in the cyclic buffer, the monitoring not requiring a transition from kernel-mode;

obtaining, via the interface, clock register values; and synchronizing audio streams between the audio device and a second audio device as a function of the clock register values, the first and second audio devices having respective and unsynchronized hardware clock registers.

12. A computer-readable medium as recited in claim 11, wherein the write position corresponds to a value of a write position register in audio hardware.

13. A computer-readable medium as recited in claim 11, wherein the play position corresponds to a value of a play position register in audio hardware.

14. A computer-readable medium as recited in claim 11, wherein the instructions further comprise instructions for determining, via the interface at regular time intervals, a play position of the cyclic buffer to calculate how far to advance the write position such that an underflow condition is avoided at the cyclic buffer through a next time interval of the regular time intervals.

15. A computer-readable medium as recited in claim 11, wherein the audio device is associated with a direct memory access (DMA) controller that does not have buffer looping capability, and wherein the computer-program instructions further comprise instructions for:

synchronizing DMA controller access to the audio stream in the cyclic buffer through audio position.

16. A computer-readable medium as recited in claim 11, wherein the computer-program instructions for configuring further comprise instructions for:

registering, by the adapter driver, a real-time miniport driver with a port class system driver of the computing system, the real-time miniport driver being configured for audio stream render or capture; and creating, by the client, a real-time device for kernel streaming of the audio stream, the real-time device comprising the real-time miniport driver and the WaveRT) port driver.

17. A computer-readable medium as recited in claim 16, further comprising computer-program instructions for:

not revoking mappings, by the real-time miniport driver, to any shared data structure during rendering or capturing of audio data; and wherein the not revoking does not cause synchronization or timing errors.

18. A computer-readable medium as recited in claim 11, wherein the computer-program instructions further comprise instructions for synchronizing the client for data read or write access to the cyclic buffer through audio position, the audio position being a function of real-time thread scheduling provided by an operating system of the computing device, and audio data write and/or play position(s) in the cyclic buffer.

19. A computer-readable medium as recited in claim 18, further comprising computer-program instructions for monitoring, by the client at regular time intervals, aspects of the audio position, the aspects being supplied by a WaveRT MiniPort driver registered by the adapter driver.

20. A computer-readable medium as recited in claim 18, further comprising computer-program instructions for reducing stream latency, by the client, by removing unnecessary padding from a regular time interval, the unnecessary padding being a function of a distance between a read position and a write position in the cyclic buffer.

21. A computing device comprising:

a processor; and a memory coupled to the processor, the memory comprising computer-program instructions executable by the processor for real-time audio streaming, the computer-program instructions comprising instructions for:

providing an interface to an adapter driver associated with an audio device;

configuring, via the interface by the adapter driver and a wave real-time (WaveRT) port driver associated with the computing device, direct access by a client of the computing device and by the audio device to a cyclic buffer for rendering and/or capturing an audio stream, the direct access being independent of any copying by a port driver on the computer system of the audio stream to any buffer;

monitoring, via the interface to the adapter driver, latency between a write position and a play position in the cyclic buffer, the monitoring not requiring a transition from kernel-mode;

obtaining, via the interface, clock register values; and synchronizing audio streams between the audio device and a second audio device as a function of the clock register values, the first and second audio devices having respective and unsynchronized hardware clock registers.

22. A computing device as recited in claim 21, wherein the write position corresponds to a value of a write position register in audio hardware.

23. A computing device as recited in claim 21, wherein the play position corresponds to a value of a play position register in audio hardware.

24. A computing device as recited in claim 21, wherein the instructions further comprise instructions for determining, via the interface at regular time intervals, a play position of the cyclic buffer to calculate how far to advance the write position such that an underflow condition is avoided at the cyclic buffer through a next time interval of the regular time intervals.

25. A computing device as recited in claim 21, wherein the audio device is associated with a direct memory access (DMA) controller that does not have buffer looping capability, and wherein the computer-program instructions further comprise instructions for:

synchronizing DMA controller access to the audio stream in the cyclic buffer through audio position.

26. A computing device as recited in claim 21, wherein the computer-program instructions for configuring further comprise instructions for:

registering, by the adapter driver, a real-time miniport driver with a port class system driver of the computing system, the real-time miniport driver being configured for audio stream render or capture; and creating, by the client, a real-time device for kernel streaming of the audio stream, the real-time device comprising the real-time miniport driver and the WaveRT port driver.

27. A computing device as recited in claim 26 wherein the computer-program instructions further comprise instructions for:

not revoking mappings, by the real-time miniport driver, to any shared data structure during rendering or capturing of audio data; and wherein the not revoking does not cause synchronization or timing errors.

28. A computing device as recited in claim 21, wherein the computer-program instructions further comprise instructions for synchronizing the client for data read or write access to the cyclic buffer through audio position, the audio position being a function of real-time thread scheduling provided by an operating system of the computing device, and audio data write and/or play position(s) in the cyclic buffer.

29. A computing device as recited in claim 28, further comprising computer-program instructions for monitoring, by the client at regular time intervals, aspects of the audio position, the aspects being supplied by a WaveRT MiniPort driver registered by the adapter driver.

30. A computing device as recited in claim 28, further comprising computer-program instructions for reducing stream latency, by the client, by removing unnecessary padding from a regular time interval, the unnecessary padding being a function of a distance between a read position and a write position in the cyclic buffer.

* * * * *